United States Patent
Yasaki et al.

(10) Patent No.: US 11,082,214 B2
(45) Date of Patent: Aug. 3, 2021

(54) KEY GENERATION APPARATUS AND KEY UPDATE METHOD

(71) Applicant: FUJITSU LIMITED, Kawasaki (JP)

(72) Inventors: Koichi Yasaki, Kawasaki (JP); Tadanobu Tsunoda, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 16/589,877

(22) Filed: Oct. 1, 2019

(65) Prior Publication Data

US 2020/0178080 A1 Jun. 4, 2020

(30) Foreign Application Priority Data

Nov. 29, 2018 (JP) .............................. JP2018-223489

(51) Int. Cl.
| | | |
|---|---|---|
| *H04L 29/06* | (2006.01) | |
| *H04L 9/08* | (2006.01) | |
| *H04L 9/32* | (2006.01) | |
| *H04L 9/14* | (2006.01) | |
| *H04W 12/08* | (2021.01) | |
| *H04W 12/069* | (2021.01) | |
| *H04W 12/0433* | (2021.01) | |

(52) U.S. Cl.
CPC .............. *H04L 9/0822* (2013.01); *H04L 9/14* (2013.01); *H04L 9/3247* (2013.01); *H04L 9/3263* (2013.01); *H04L 9/3271* (2013.01); *H04L 63/0823* (2013.01); *H04W 12/0433* (2021.01); *H04W 12/069* (2021.01); *H04W 12/08* (2013.01)

(58) Field of Classification Search
CPC ........... H04W 12/069; H04W 12/0433; H04W 12/08; H04L 9/0822; H04L 9/14; H04L 9/3247; H04L 9/3263; H04L 9/3271
See application file for complete search history.

(56) References Cited

U.S. PATENT DOCUMENTS

| | | | |
|---|---|---|---|
| 6,240,187 B1 * | 5/2001 | Lewis ................ G06Q 20/3829 | 380/282 |
| 9,912,486 B1 * | 3/2018 | Sharifi Mehr .......... H04L 9/321 | |
| 10,454,689 B1 * | 10/2019 | Sharifi Mehr ........ H04L 63/166 | |
| 2006/0159269 A1 * | 7/2006 | Braun ..................... H04L 9/321 | 380/277 |
| 2010/0122081 A1 | 5/2010 | Sato et al. | |

(Continued)

FOREIGN PATENT DOCUMENTS

| | | |
|---|---|---|
| JP | 2004-248220 A | 9/2004 |
| JP | 2010-118858 A | 5/2010 |

*Primary Examiner* — Sher A Khan
(74) *Attorney, Agent, or Firm* — Fujitsu Patent Center

(57) ABSTRACT

A key generation apparatus includes a memory, a communication interface, and a processor. The memory stores a first private key corresponding to a first public key. The communication interface communicates with a peer apparatus that stores the first public key. The processor generates a second public key and a second private key in response to a key update request from the peer apparatus, generates a digital signature by encrypting data including the second public key with the first private key, and sends a message including the data and the digital signature to the peer apparatus. In addition, the processor switches the first private key to the second private key.

6 Claims, 14 Drawing Sheets

(56) References Cited

U.S. PATENT DOCUMENTS

| | | | | |
|---|---|---|---|---|
| 2014/0380055 | A1* | 12/2014 | Blanchard | H04L 9/3247 713/171 |
| 2015/0363607 | A1* | 12/2015 | Yang | H04L 9/3226 713/165 |
| 2016/0149899 | A1* | 5/2016 | Abbott | H04L 63/061 713/171 |
| 2017/0249456 | A1* | 8/2017 | Fu | H04L 9/3234 |
| 2018/0183590 | A1* | 6/2018 | Kuo | H04L 9/14 |
| 2018/0349127 | A1* | 12/2018 | Haase | G06F 8/654 |

* cited by examiner

TERMINAL KEY TABLE

| MAC ADDRESS | KEY ID | PUBLIC KEY | GENERATION DATE | UPDATED FLAG |
|---|---|---|---|---|
| 11:22:33:44:55:66 | KID00108 | (PKEY00108) | 2018/09/03 | ON |
| 11:22:33:44:55:77 | KID00202 | (PKEY00202) | 2018/04/06 | OFF |
| ... | ... | ... | ... | ... |

KEY GENERATION APPARATUS AND KEY UPDATE METHOD

CROSS-REFERENCE TO RELATED APPLICATION

This application is based upon and claims the benefit of priority of the prior Japanese Patent Application No. 2018-223489, filed on Nov. 29, 2018, the entire contents of which are incorporated herein by reference.

FIELD

The embodiments discussed herein are related to a key generation apparatus and a key update method.

BACKGROUND

When a terminal apparatus communicates with a peer apparatus, there are cases in which public key encryption is used to improve security. For example, when a terminal apparatus wirelessly connects to an access point, the access point could authenticate the terminal apparatus based on public key encryption. If the access point has successfully authenticated the terminal apparatus, the access point permits the connection thereto. This technique aims to prevent unauthorized connection to the access point. In this case, the terminal apparatus holds a private key corresponding thereto, and the peer apparatus holds a public key corresponding to the terminal apparatus. Setting these public key and private key in advance could be referred to as provisioning, and disabling these keys could be referred to as deprovisioning.

There has been proposed a certificate issuing apparatus that facilitates authentication processing in a transient period when a certificate authority updates a key. The proposed certificate issuing apparatus writes an old public key certificate and a new public key certificate of the certificate authority and a new public key certificate of a terminal apparatus that depends on the new public key certificate of the certificate authority in a hardware token and distributes the hardware token to the terminal apparatus. In this way, an authentication server that communicates with the terminal apparatus is able to perform authentication processing on both a terminal apparatus that has not updated a public key certificate yet and a terminal apparatus that has already updated a public key certificate, by using an old public key certificate of the authentication server.

In addition, there has been proposed a verification server that verifies the validity of a public key certificate of a terminal apparatus when a certificate authority has updated a key. The proposed verification server holds a new public key certificate of the certificate authority and a list of expired public key certificates of terminal apparatuses issued before and after an update. The verification server receives a verification request including a public key certificate of a certain terminal apparatus and an old public key certificate of the certificate authority corresponding to the time of the issuance of the public key certificate of the terminal apparatus. When the validity of the certificate authority is checked, if the public key certificate of the verification target terminal apparatus is not included in the expiration list, the verification server determines that the public key certificate of the verification target terminal apparatus is valid and sends a verification result as a reply.

See, for example, Japanese Laid-open Patent Publication No. 2004-248220 and Japanese Laid-open Patent Publication No. 2010-118858.

SUMMARY

According to one aspect, there is provided a key generation apparatus including: a memory configured to store a first private key corresponding to a first public key; a communication interface configured to communicate with a peer apparatus that stores the first public key; and a processor configured to generate a second public key and a second private key in response to a key update request from the peer apparatus, generate a digital signature by encrypting data including the second public key with the first private key, send a message including the data and the digital signature to the peer apparatus via the communication interface, and switch the first private key to the second private key.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates a data structure example of the access point;

DESCRIPTION OF EMBODIMENTS

There are cases in which the administrator needs to manually and securely set a private key in an individual terminal apparatus in provisioning by using a portable recording medium, a cable, etc. In these cases, a large burden is imposed on the administrator. In addition, a key pair of a public key and a private key assigned to an individual terminal apparatus is not used permanently. Namely, there is an effective period in terms of security. This effective period is determined in view of theoretical decryption time needed for estimating the private key from a plaintext, a ciphertext, or the public key. Thus, a key pair of an individual terminal apparatus is updated regularly. In addition, if vulnerability is found in the key generation algorithm, the theoretical decryption time needed could be shortened. In this case, a key pair of an individual terminal apparatus is updated irregularly. Thus, the above conventional techniques have a problem in that a large burden is imposed on the administrator when the administrator updates a key.

Hereinafter, embodiments will be described with reference to the accompanying drawings.

First Embodiment

A first embodiment will be described.

Figure 1:
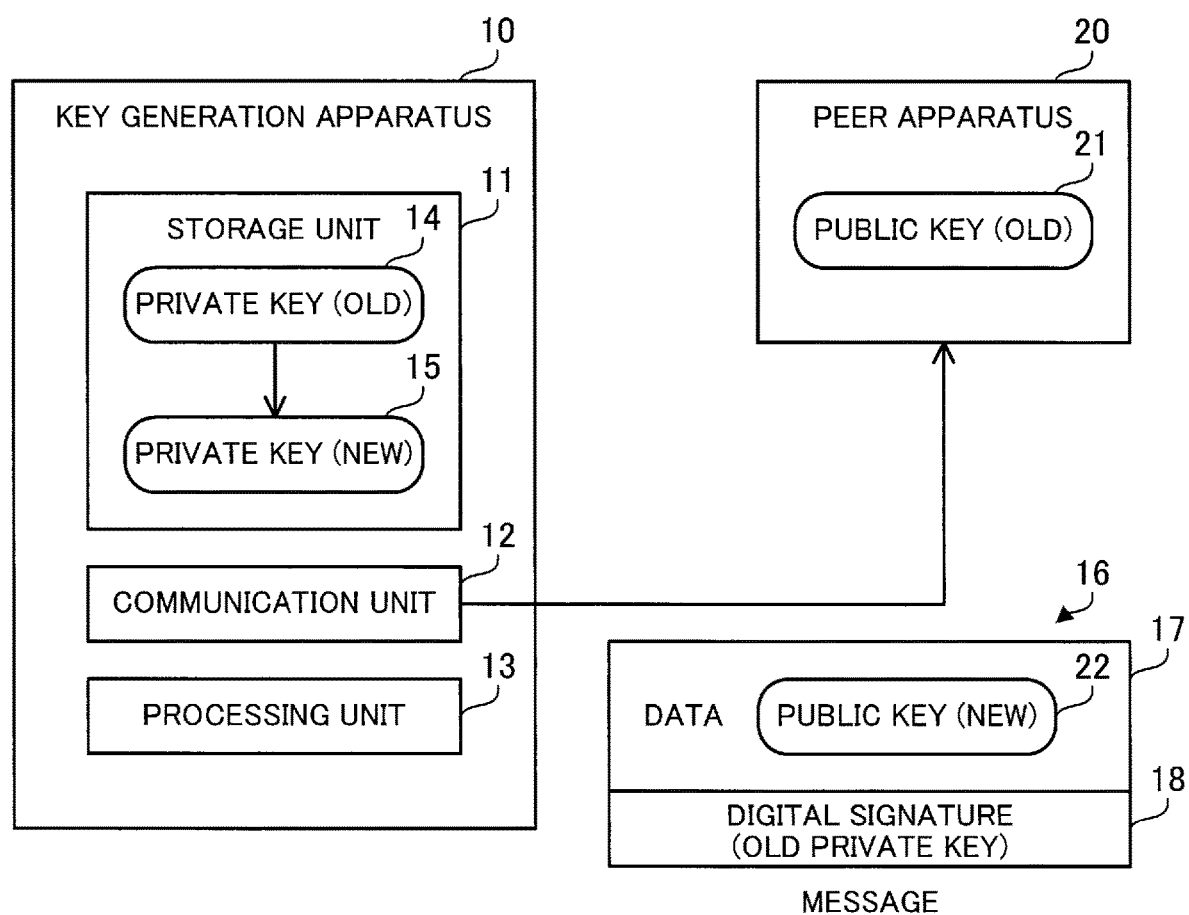
FIG. 1 illustrates an example of a key generation apparatus according to a first embodiment.

FIG. 1 illustrates an example of a key generation apparatus 10 according to the first embodiment.

The key generation apparatus 10 communicates with a peer apparatus 20 by using public key encryption. An information processing apparatus or a computer may be used as the key generation apparatus 10. The key generation apparatus 10 may be a terminal apparatus or a server apparatus operated by a user. The key generation apparatus 10 and the peer apparatus 20 may communicate with each other via a wireless network or a wired network. The peer apparatus 20 authenticates the key generation apparatus 10 by using public key encryption, for example. Various kinds of apparatus such as a wireless access point, a gateway, or an authentication server may be used as the peer apparatus 20.

A public key 21 (an old public key) and a private key 14 (an old private key) corresponding thereto are assigned to the key generation apparatus 10. The key generation apparatus 10 holds the private key 14, and the peer apparatus 20 holds the public key 21. In view of security, it is preferable that the public key and the private key of the key generation apparatus 10 be updated regularly. There are cases in which the public key and the private key of the key generation apparatus 10 need to be updated irregularly, for example, when vulnerability is found in the key generation algorithm. According to the first embodiment, the key generation apparatus 10 and the peer apparatus 20 update the private key 14 held by the key generation apparatus 10 and the public key 21 held by the peer apparatus 20 by communicating with each other.

The key generation apparatus 10 includes a storage unit 11, a communication unit 12, and a processing unit 13. The storage unit 11 may be a volatile semiconductor memory such as a random access memory (RAM) or a non-volatile storage such as a hard disk drive (HDD) or a solid state drive (SSD). Alternatively, the storage unit 11 may be a memory of a security device having tamper resistance such as a hardware security module (HSM). The communication unit 12 is a communication interface. The communication unit 12 may be a wireless interface or wired interface. The processing unit 13 is, for example, a processor such as a central processing unit (CPU), a graphics processing unit (GPU), or a digital signal processor (DSP). Alternatively, the processing unit 13 may include an electronic circuit designed for specific use, such as an application specific integrated circuit (ASIC) or a field programmable gate array (FPGA). A group of processors will be referred to as a "multiprocessor" or simply "a processor", as needed.

The storage unit 11 holds the private key 14. The communication unit 12 communicates with the peer apparatus 20 that holds the public key 21 corresponding to the private key 14. The processing unit 13 receives a key update request from the peer apparatus 20 via the communication unit 12. In response to the key update request, the processing unit 13 generates a public key 22 (a new public key) and a private key 15 (a new private key) corresponding thereto.

After generating the public key 22 and the private key 15, the processing unit 13 generates data 17 including the public key 22 and generates a digital signature 18 by encrypting the data 17 with the private key 14. The data 17 may additionally include a key ID that identifies the key pair of the public key 22 and the private key 15, a generation date, and proof information indicating that the private key 14 and the private key 15 have been generated by the same apparatus. The digital signature 18 is obtained by encrypting the data 17 or a hash value thereof with the private key 14. The processing unit 13 generates a message 16 including the data 17 and the digital signature 18 and sends the message 16 to the peer apparatus 20 via the communication unit 12. Next, the processing unit 13 switches the private key 14 held by the key generation apparatus 10 to the private key 15.

The message 16 indicates that the holder of the private key 14 (the old private key) guarantees the validity of the public key 22 (the new public key). The message 16 may be referred to as a parent-child certificate. After receiving the message 16, the peer apparatus 20 verifies the digital signature 18 by using the public key 21 held by the peer apparatus 20. For example, the peer apparatus 20 decrypts the digital signature 18 by using the public key 21 and determines that the digital signature 18 has successfully been verified if the decryption result matches the data 17 or a hash value thereof. If the digital signature 18 is successfully verified, the peer apparatus 20 switches the public key 21 held thereby to the public key 22.

The processing unit 13 may send the message 16 when the peer apparatus 20 authenticates the key generation apparatus 10. For example, the processing unit 13 may send the message 16 when the key generation apparatus 10 connects to the peer apparatus 20. When the peer apparatus 20 authenticates the key generation apparatus 10 based on challenge response authentication, for example, the peer apparatus 20 sends a challenge message to the key generation apparatus 10, and the key generation apparatus 10 sends the message 16 as a response message to the peer apparatus 20. The data 17 may further include a character string as a challenge or a character string generated from a challenge. The challenge message may include a key ID that specifies a private key to be used. After generating the public key 22 and the private key 15, if the processing unit 13 receives a challenge message that specifies the private key 14, the processing unit 13 may send the message 16 for the key update as a response message.

The key generation apparatus 10 according to the first embodiment generates the public key 22 (the new public key) and the private key 15 (the new private key) in response to a key update request from the peer apparatus 20 that holds the public key 21 (the old public key). The key generation apparatus 10 generates the digital signature 18 by encrypting the data 17 including the public key 22 with the private key 14 (the old private key) and sends the message 16 including the data 17 and the digital signature 18 to the peer apparatus 20. Next, the key generation apparatus 10 switches the private key 14 to the private key 15.

As described above, since the peer apparatus 20 verifies the digital signature 18 by using the public key 21, the peer apparatus 20 is able to determine that the validity of the public key 22 is guaranteed by the holder of the private key 14. Thus, the peer apparatus 20 is able to securely switch the public key 21 to the public key 22. In addition, the key update by the key generation apparatus 10 and the peer apparatus 20 based on public key encryption is simplified. For example, since the administrator does not need to manually distribute the private key 15 by using a portable recording medium, a cable, etc., the burden on the administrator is reduced.

Second Embodiment

Next, a second embodiment will be described.

Figure 2:
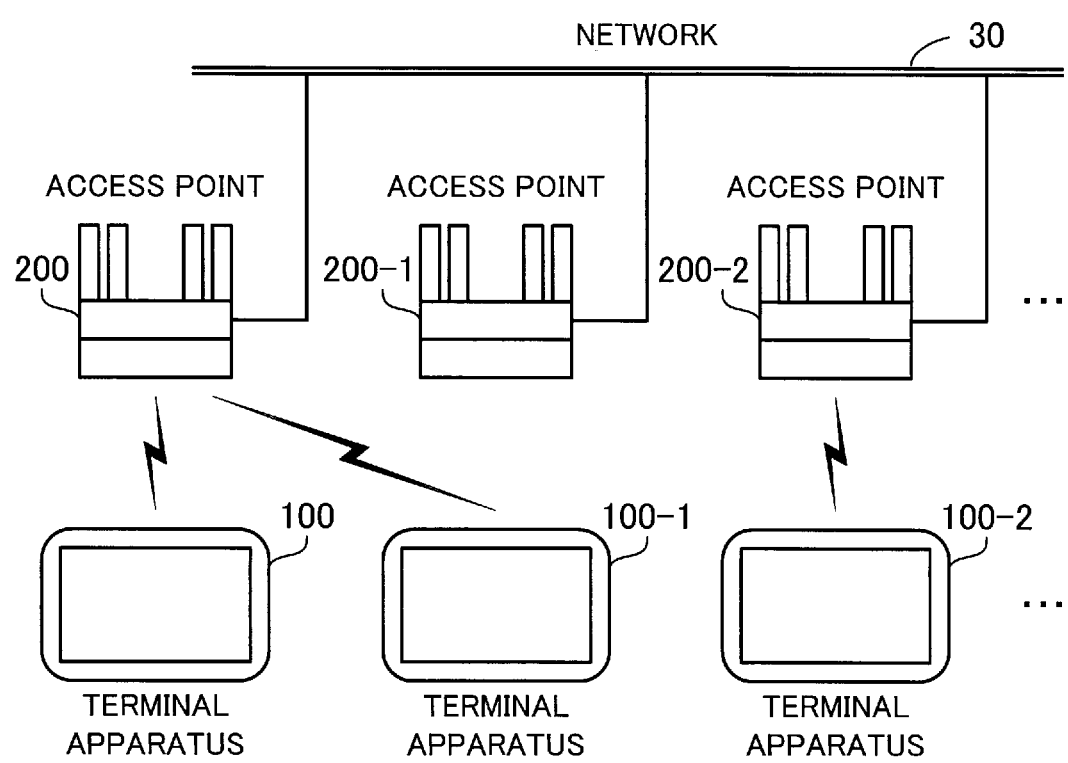
FIG. 2 illustrates an example of an information processing system according to a second embodiment.

FIG. 2 illustrates an example of an information processing system according to a second embodiment.

In the information processing system according to the second embodiment, an access point that performs wireless communication authenticates terminal apparatuses when these terminal apparatuses request connection thereto and prevents unauthorized connection by unauthorized parties.

The information processing system according to the second embodiment includes a plurality of terminal apparatuses such as terminal apparatuses 100, 100-1, and 100-2 and a plurality of access points such as access points 200, 200-1, and 200-2. These access points are connected to a network 30. The network 30 is a wired local network such as a local area network (LAN). The plurality of terminal apparatuses and the plurality of access points communicate with each other wirelessly. An individual terminal apparatus is connectable to any of the plurality of access points. For example, an individual terminal apparatus searches predetermined access points for a nearby access point, connects to this access point, and performs wireless communication.

The information processing system according to the second embodiment may be installed at a school. For example, the plurality of access points may be installed at different locations in a school. The plurality of terminal apparatuses are lent to students. The plurality of terminal apparatuses may be tablet terminals used in class. The students may carry around their terminal apparatuses. The terminal apparatus 100 corresponds to the key generation apparatus 10 according to the first embodiment, and the access point 200 corresponds to the peer apparatus 20 according to the first embodiment.

Figure 3:
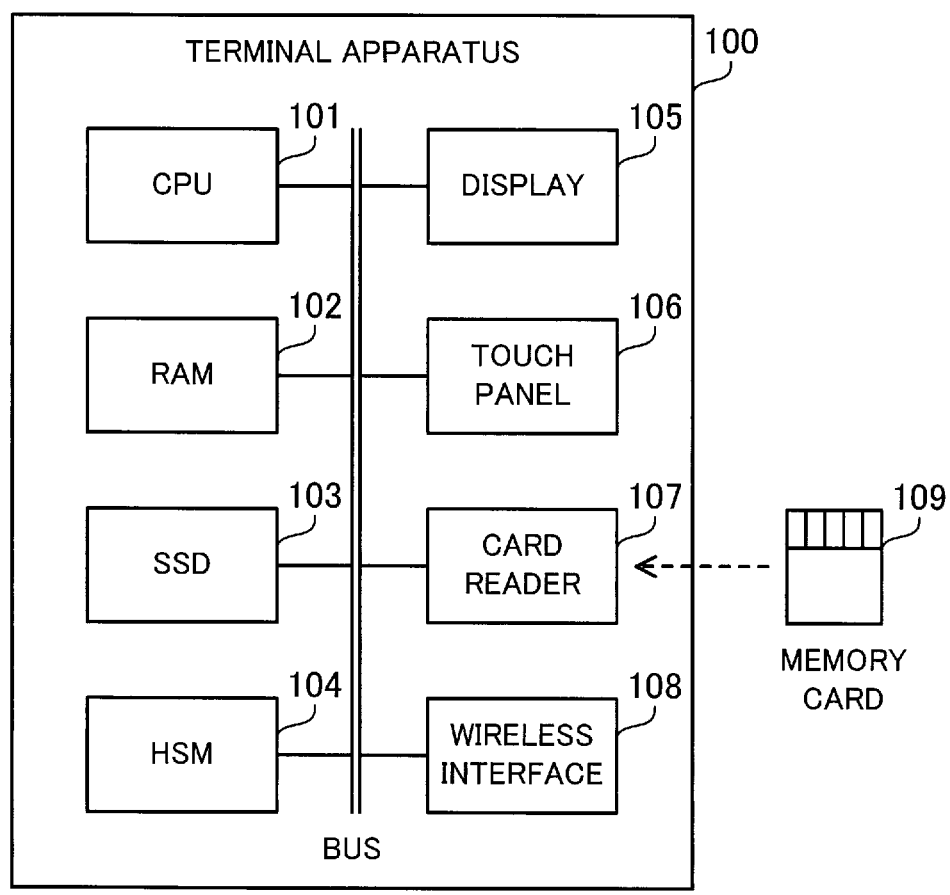
FIG. 3 is a block diagram illustrating a hardware example of a terminal apparatus.

FIG. 3 is a block diagram illustrating a hardware example of the terminal apparatus 100.

The terminal apparatus 100 includes a CPU 101, a RAM 102, an SSD 103, an HSM 104, a display 105, a touch panel 106, a card reader 107, and a wireless interface 108, which are connected to a bus. The other terminal apparatuses such as the terminal apparatuses 100-1 and 100-2 also include the same hardware as that of the terminal apparatus 100. The RAM 102, the SSD 103, or the HSM 104 corresponds to the storage unit 11 according to the first embodiment. The wireless interface 108 corresponds to the communication unit 12 according to the first embodiment. The CPU 101 or the HSM 104 corresponds to the processing unit 13 according to the first embodiment.

The CPU 101 is a processor that executes program commands. The CPU 101 loads a program and at least part of the data stored in the SSD 103 to the RAM 102 and executes the program. The CPU 101 may include a plurality of processor cores, and the terminal apparatus 100 may include a plurality of processors. A group of processors will be referred to as a "multiprocessor" or simply "a processor", as needed.

The RAM 102 is a volatile semiconductor memory that temporarily holds a program executed by the CPU 101 or data used by the CPU 101 for calculation. The terminal apparatus 100 may include a different kind of memory other than a RAM or may include a plurality of memories.

The SSD 103 is a non-volatile storage that holds an operating system (OS), a program such as application software, and data. The terminal apparatus 100 may include a different kind of non-volatile storage such as an HDD.

The HSM 104 is a security device that securely manages encryption keys such as a public key and a private key. The HSM 104 includes a non-volatile storage that holds the encryption keys and an electronic circuit that performs processing relating to the encryption keys. For example, in response to a command from the CPU 101, the HSM 104 generates a new encryption key in accordance with a predetermined key generation algorithm. For example, in response to a command from the CPU 101, the HSM 104 writes an encryption key in an internal non-volatile storage and protects the encryption key from unauthorized access from the outside. In addition, for example, in response to a command from the CPU 101, the HSM 104 performs encryption processing such as processing for encryption or decryption. The encryption processing may include generation of a digital signature by using a private key. The terminal apparatus 100 is also able to manage an encryption key by using software such as the OS, without using the HSM 104. The terminal apparatus 100 may include two or more HSMs.

The display 105 displays an image in accordance with a command from the CPU 101. Examples of the display 105 include a liquid crystal display (LCD) and an organic electro-luminescence (OEL) display. The terminal apparatus 100 may include a different kind of output device.

The touch panel 106 is arranged over the display 105 and detects a touch position when the user performs a touch operation on the display 105. The touch panel 106 notifies the CPU 101 of the touch position detected. Any method may be used to detect the touch position. For example, a resistive touch panel or a capacitive touch panel may be used as the touch panel 106. The terminal apparatus 100 may include a different kind of input device such as a touchpad, a keyboard, a trackball, or a switch button. The terminal apparatus 100 may include two or more input devices.

The card reader 107 is a reading device that reads a program or data stored in a memory card 109. The memory card 109 is a non-volatile semiconductor memory that uses a flash memory or the like and is a portable recording medium. The card reader 107 stores a program or data read from the memory card 109 in the RAM 102 or the SSD 103. The terminal apparatus 100 may include a reading device that reads a program or data stored in a different kind of portable recording medium. Examples of the different kind of portable recording medium include a magnetic disk such as a flexible disk (FD), an optical disc such as a compact disc (CD) or a digital versatile disc (DVD), and a magneto-optical disk (MO).

The wireless interface 108 is a communication interface that performs wireless communication by connecting to any one of the access points such as the access points 200, 200-1, and 200-2. The wireless interface 108 is compliant with, for example, the communication standards of the IEEE (The Institute of Electrical and Electronics Engineers) 802.11 series.

Figure 4:
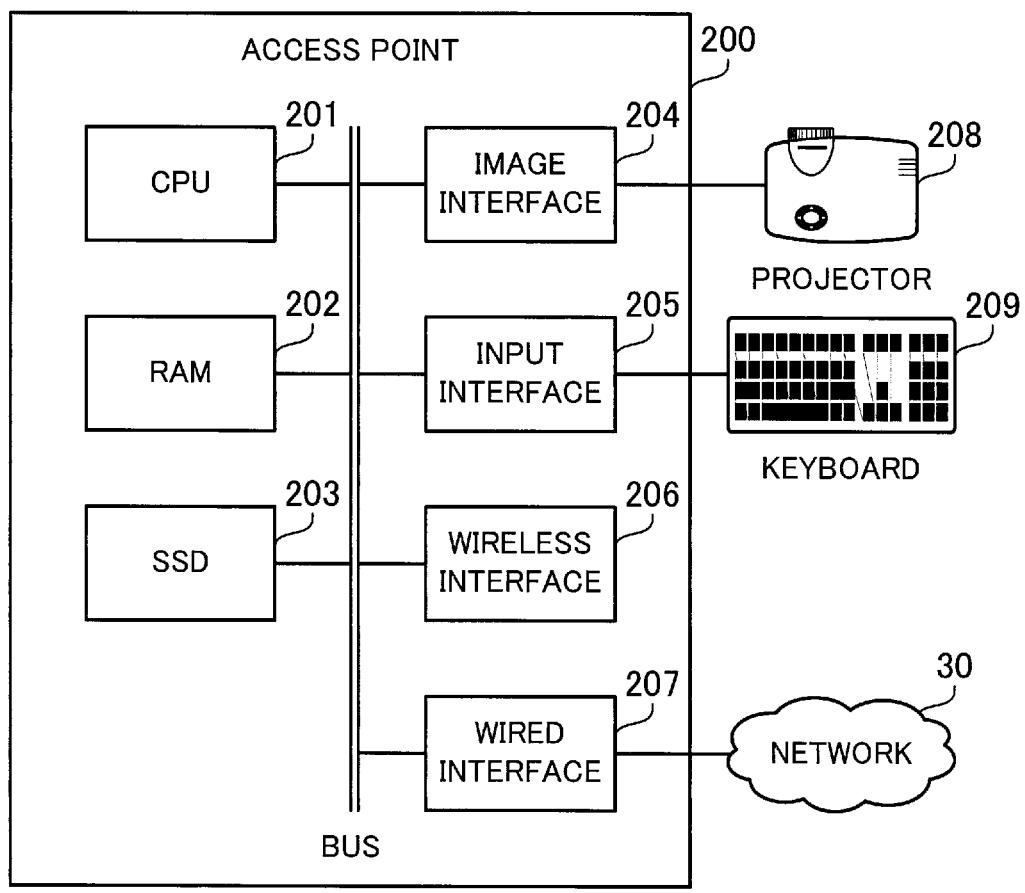
FIG. 4 is a block diagram illustrating a hardware example of an access point.

FIG. 4 is a block diagram illustrating a hardware example of the access point 200.

The access point 200 includes a CPU 201, a RAM 202, an SSD 203, an image interface 204, an input interface 205, a wireless interface 206, and a wired interface 207, which are connected to a bus. The other access points such as the access points 200-1 and 200-2 include the same hardware as that of the access point 200.

The CPU 201 is a processor that executes program commands. The CPU 201 loads a program and at least part of the data stored in the SSD 203 to the RAM 202 and executes the program. The RAM 202 is a volatile semiconductor memory that temporarily holds the program executed by the CPU 201 and the data used by the CPU 201 for calculation. The SSD 203 is a non-volatile storage that holds the program and data. The access point 200 may include a different kind of non-volatile storage such as an HDD.

The image interface 204 outputs an image to a projector 208 connected to the access point 200 in response to a command from the CPU 201. The projector 208 is a display device that projects an image on a screen. A different kind of display device such as an LCD or OEL display may be connected to the access point 200.

The input interface 205 receives an input signal from a keyboard 209 connected to the access point 200 and notifies the CPU 201 of the input signal. A different kind of input device such as a mouse may be connected to the access point 200.

The wireless interface 206 is a communication interface that performs wireless communication when receiving a connection request from any one of the terminal apparatuses such as the terminal apparatuses 100, 100-1, and 100-2. The wired interface 207 is a communication interface connected to the network 30. The wired interface 207 is able to communicate with the other access points such as the access points 200-1 and 200-2 via the network 30. For example, the wired interface 207 is connected to a wired communication apparatus such as a switch or a router via a cable.

Next, authentication performed when a single terminal apparatus connects to a single access point will be described. According to the second embodiment, the access points authenticate the terminal apparatuses based on challenge response authentication using public key encryption. Private keys are set in advance in their respective terminal apparatuses by provisioning. The public keys of the plurality of terminal apparatuses are set in advance in an individual one of the plurality of access points by provisioning.

Figure 5:
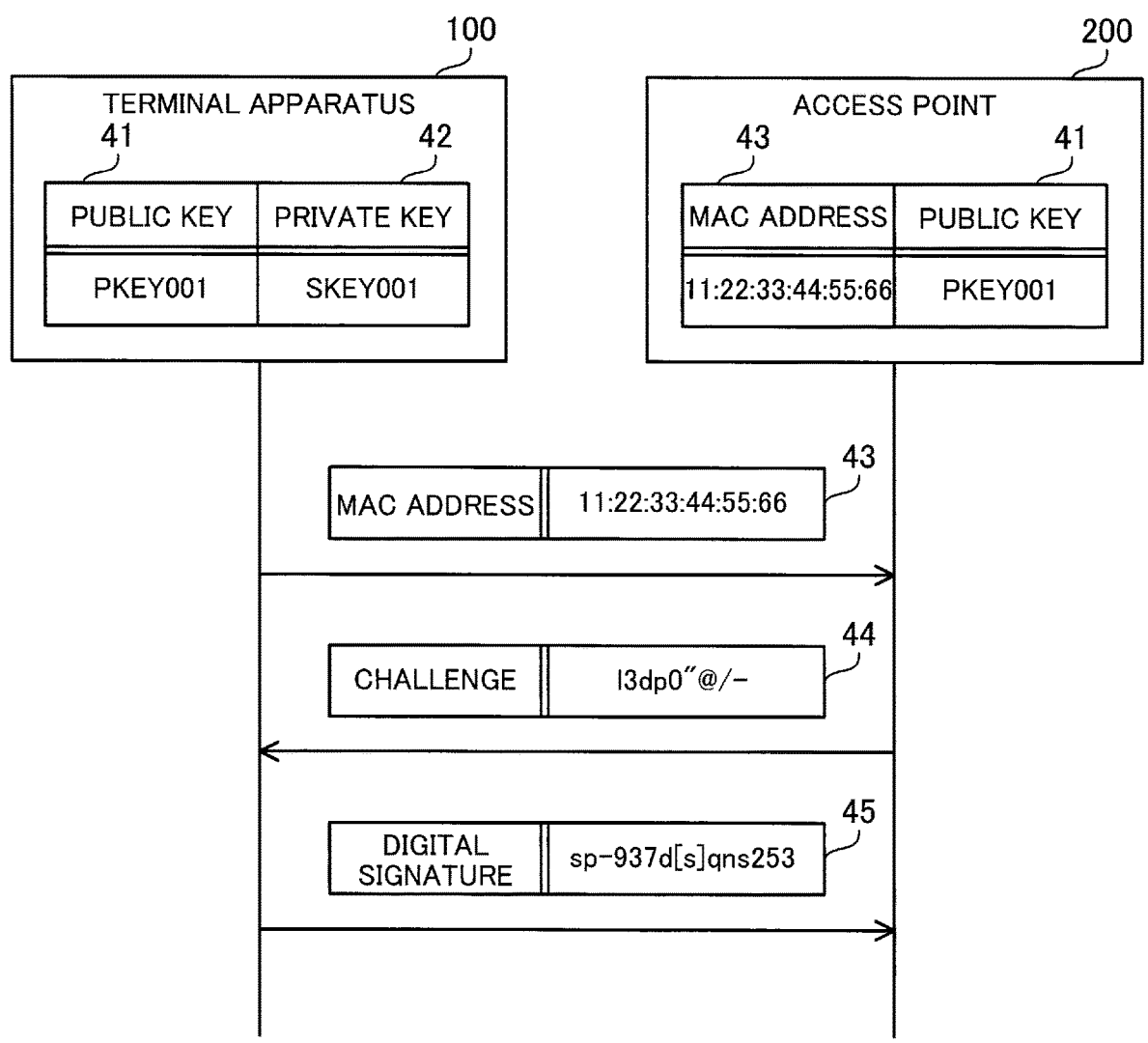
FIG. 5 illustrates an authentication example of the terminal apparatus based on public key encryption.

FIG. 5 illustrates an authentication example of the terminal apparatus 100 based on public key encryption.

The present example assumes that the terminal apparatus 100 connects to the access point 200. The terminal apparatus 100 holds a public key 41 thereof and a private key 42 corresponding thereto. As long as the access point 200 is able to use the public key 41, the terminal apparatus 100 does not need to hold the public key 41. The access point 200 holds the public key 41 in association with a medium access control (MAC) address 43 of the terminal apparatus 100. The MAC address 43 is a physical address that identifies the wireless interface 108.

The terminal apparatus 100 notifies the access point 200 of the MAC address 43 of the terminal apparatus 100. The access point 200 sends a challenge 44 to the terminal apparatus 100. The challenge 44 is information that changes per authentication. For example, the challenge 44 is a randomly generated character string. The terminal apparatus 100 generates a digital signature 45 from the challenge 44 and the private key 42. For example, the terminal apparatus 100 encrypts the challenge 44 itself, a code obtained by synthesizing the challenge 44 and a different character string, or a code such as a hash value of the above code, by using the private key 42.

The terminal apparatus 100 sends the digital signature 45 to the access point 200. The access point 200 verifies the digital signature 45. Specifically, the access point 200 decrypts the digital signature by using the public key 41 corresponding to the MAC address 43 supplied from the terminal apparatus 100. The access point 200 matches the decryption result of the digital signature 45 against the sent challenge 44 itself, the code obtained by synthesizing the challenge 44 and the different character string, or the code such as a hash value of the above code and determines that the digital signature 45 has successfully been verified if both of the data matches.

Under the premise that the private key 42 corresponding to the public key 41 is held by only the valid terminal apparatus, by checking that a digital signature of an appropriate content has been generated by using the private key 42, the access point 200 determines that the terminal apparatus 100 is the valid terminal apparatus. If the access point 200 successfully verifies the digital signature 45, the access point 200 permits the connection from the terminal apparatus 100. In this way, by using public key encryption, security of the access point 200 is improved.

It is preferable that the public keys and the private keys of the plurality of terminal apparatuses such as the terminal apparatuses 100, 100-1, and 100-2 be updated regularly in terms of security. This is because, even if a private key is not directly leaked, the private key could be estimated by encryption decipher processing from a plaintext, a ciphertext, and the public key over a long time. In addition, since vulnerability could be found in the key generation algorithm, there are cases in which it is preferable that the public keys and the private keys of the plurality of terminal apparatuses be updated irregularly.

However, securely updating the private keys held by the plurality of terminal apparatuses and the public keys held by the plurality of access points has a problem in that a large burden is imposed on the administrator. For example, setting private keys in their respective terminal apparatuses by using a cable or a portable recording medium needs manual work by the administrator, which is a large burden on the administrator. While a key management server could be used to integrally distribute the public keys to the plurality of access points, additionally operating the key management server results in a large burden on the administrator. In addition, it may be difficult to assign an appropriate administrator with high information processing skills in certain operation environments such as schools. To solve this problem, the second embodiment enables simple key update as will be described below.

Figure 6:
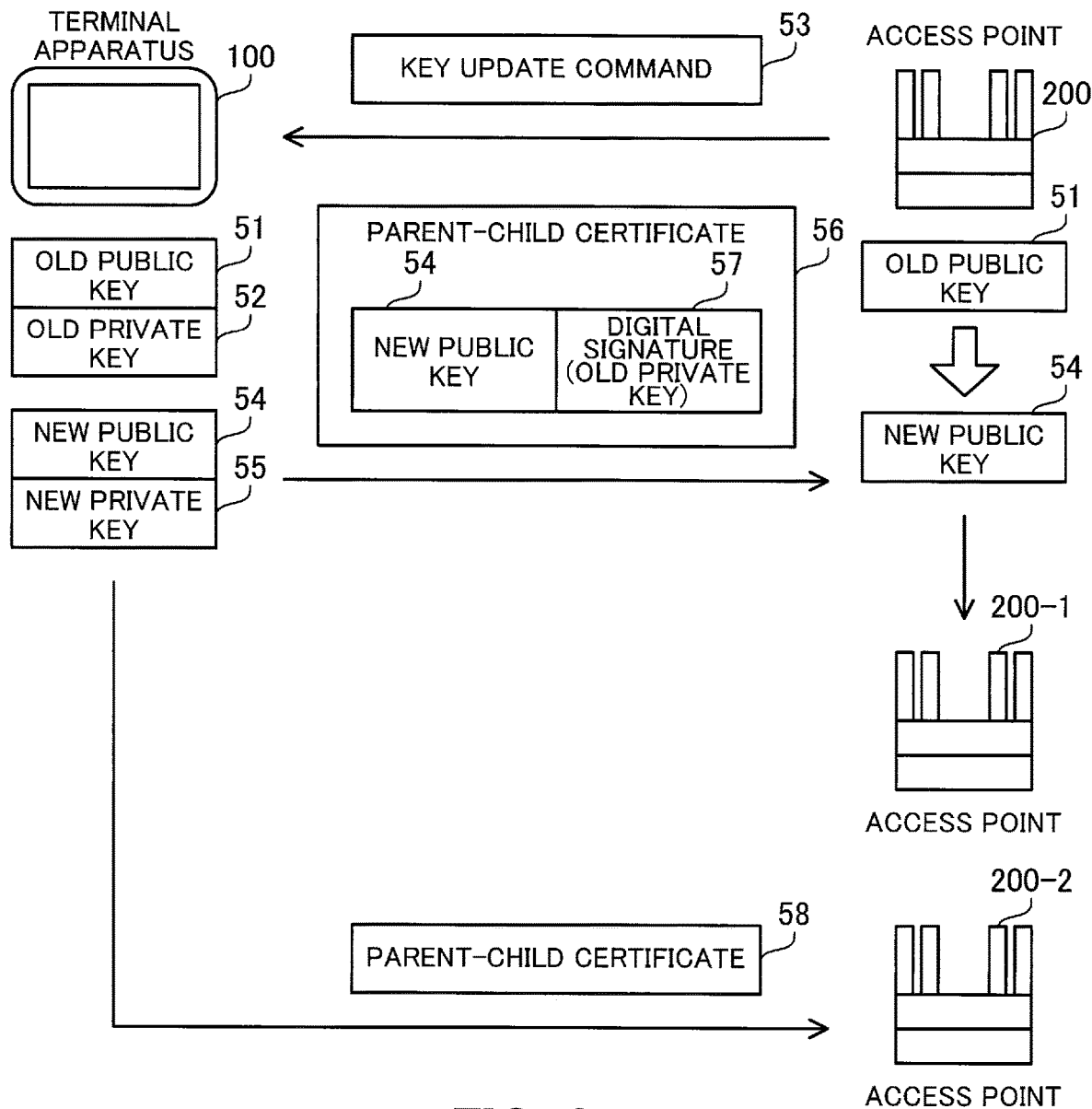
FIG. 6 illustrates a key update example that uses a parent-child certificate.

FIG. 6 illustrates a key update example using a parent-child certificate.

In the present example, the update of the public key and the private key of the terminal apparatus 100 is reflected on the terminal apparatus 100 and the access points 200, 200-1, and 200-2. The terminal apparatus 100 holds an old public key 51 thereof and an old private key 52 corresponding thereto. Alternatively, the old public key 51 does not need to be held by the terminal apparatus 100. The access point 200 holds the old public key 51 of the terminal apparatus 100. Likewise, the access points 200-1 and 200-2 hold the old public key 51 of the terminal apparatus 100.

When the administrator determines a key update, the administrator sets the start of the update in one of the access points. The access point that sets the start of the update may be selected randomly, and the administrator may set only one of the access points. The present example assumes that the administrator has set the start of the update in the access point 200. For example, the access point 200 outputs a management screen to the projector 208 and receives setting items from the keyboard 209. The administrator enters the setting items by using the keyboard 209 while viewing the management screen projected by the projector 208.

After the administrator sets the start of the update in the access point 200, when the terminal apparatus 100 connects to the access point 200 for the first time, the access point 200 sends a key update command 53 to the terminal apparatus 100. The key update command 53 includes a renewal deadline. When receiving the key update command 53, the terminal apparatus 100 generates a new public key 54 thereof and a new private key 55 corresponding thereto. The terminal apparatus 100 securely holds the new private key 55 and holds the old private key 52 at least until the renewal deadline without discarding the old private key 52.

When the terminal apparatus 100 has generated the new public key 54 and the new private key 55, the terminal apparatus 100 responds to a challenge from the access point 200 by sending a parent-child certificate 56 in place of a normal response. The parent-child certificate 56 is a digital certificate indicating that the holder of the old private key 52 guarantees that the new public key 54 is valid. The parent-child certificate 56 includes the generated new public key 54 and a digital signature 57. The digital signature 57 is data obtained by encrypting data including the new public key 54 or a hash value of the data with the old private key 52.

The access point 200 verifies the digital signature 57 included in the parent-child certificate 56. Specifically, the access point 200 decrypts the digital signature 57 by using the old public key 51 and matches the decryption result against the data or a hash value thereof included in the parent-child certificate 56. If both of the data matches, the access point 200 determines that the digital signature 57 has been successfully verified. If not, the access point 200 determines that the digital signature 57 has not been successfully verified. Successful verification of the digital signature 57 signifies that the holder of the old private key 52 corresponding to the old public key 51 guarantees that the new public key 54 included in the parent-child certificate 56 is valid. If the valid terminal apparatus alone holds the old private key 52, the parent-child certificate 56 is also creditable. If the digital signature 57 has been successfully verified, the access point 200 updates the old public key 51 to the new public key 54.

When the access point 200 updates the old public key 51 to the new public key 54, if possible, the access point 200 broadcasts the new public key 54 to the other access points via the network 30. In this way, the update procedure between the terminal apparatus 100 and the other access points could be omitted. The access point 200 could fail to send the new public key 54 to a different access point. For example, the access point 200 fails to send the new public key 54 to a different access point whose power supply is temporarily off. As another example, the access point 200 fails to send the new public key 54 to a different access point when the network 30 is temporarily disabled.

The present example assumes that the access point 200 has successfully sent the new public key 54 to the access point 200-1 and that the access point 200 has failed to send the new public key 54 to the access point 200-2. The access point 200-1 receives the new public key 54 and updates the old public key 51 held by the access point 200-1 to the new public key 54.

Subsequently, when the terminal apparatus 100 connects to the access point 200, since the public key held by the access point 200 has already been updated, the access point 200 does not send a key update command to the terminal apparatus 100. In addition, the terminal apparatus 100 does not send a parent-child certificate to the access point 200 in response to a challenge from the access point 200 to the terminal apparatus 100. Instead, the terminal apparatus 100 sends a normal response. At this point, the terminal apparatus 100 sends a digital signature encrypted by using the new private key 55, not the old private key 52.

Subsequently, when the terminal apparatus 100 connects to the access point 200-1, since the start of the update has not been set in the access point 200-1, the access point 200-1 does not send a key update command to the terminal apparatus 100. In addition, while no update procedure has been performed between the terminal apparatus 100 and the access point 200-1, the public key held by the access point 200-1 has already been updated. Thus, in response to a challenge from the access point 200-1 to the terminal apparatus 100, the terminal apparatus 100 does not send a parent-child certificate to the access point 200-1. Instead, the terminal apparatus 100 sends a normal response.

Subsequently, when the terminal apparatus 100 connects to the access point 200-2, since the start of the update has not been set in the access point 200-2, the access point 200-2 does not send a key update command to the terminal apparatus 100. However, the public key held by the access point 200-2 has not been updated yet. Thus, in response to a challenge from the access point 200-2 to the terminal apparatus 100, the terminal apparatus 100 sends a parent-child certificate 58 to the access point 200-2. The parent-child certificate 58 includes the new public key 54 and a digital signature encrypted by using the old private key 52. The access point 200-2 verifies the digital signature included in the parent-child certificate 58 and updates, if the digital signature has successfully been verified, the old public key 51 to the new public key 54.

In this way, when the administrator sets the start of the update in one of the access points, an individual terminal apparatus receives a key update command and generates a new public key and a new private key. Next, an individual terminal apparatus sends a parent-child certificate that guarantees the validity of the new public key to at least one of the access points. An individual access point updates the old public keys held therein to the new public keys through reception of the parent-child certificates or inter-access-point communication.

Figure 7:
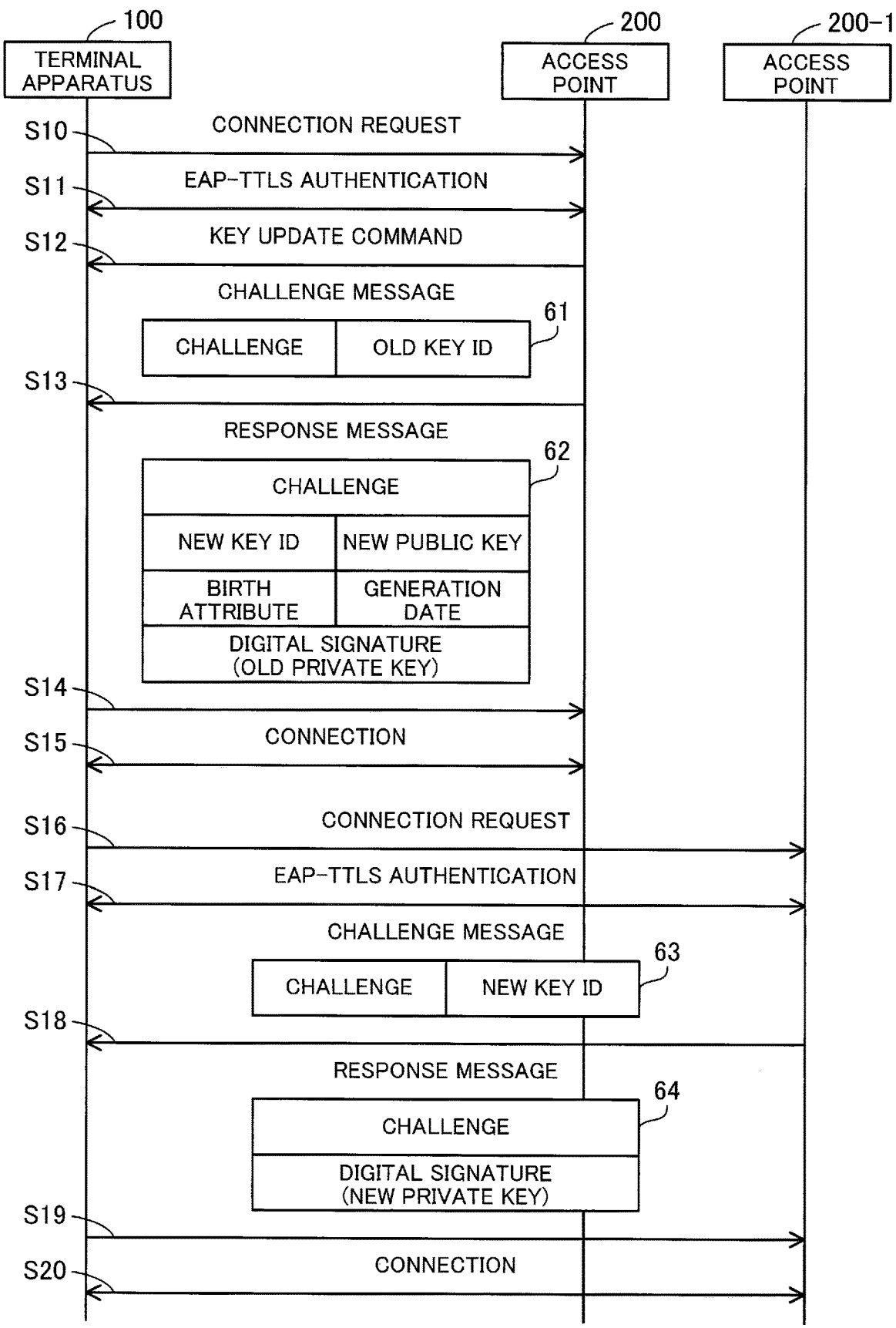
FIG. 7 illustrates an authentication example of the terminal apparatus in a key renewal period.

FIG. 7 illustrates an authentication example of a terminal apparatus in a key renewal period.

The terminal apparatus 100 sends a connection request to the access point 200 (S10). The terminal apparatus 100 and the access point 200 perform EAP-TTLS (Extensible Authentication Protocol-Tunneled Transport Layer Security) authentication (S11).

As a prerequisite for the EAP-TTLS authentication, the terminal apparatus 100 holds a public key of a predetermined root certificate authority (CA). The access point 200 holds a TLS certificate that indicates the validity of the access point 200. This TLS certificate includes a digital signature encrypted by using the private key of the root certificate authority. In the EAP-TTLS authentication, the access point 200 sends the TLS certificate of the access point 200 to the terminal apparatus 100. The terminal apparatus 100 verifies the TLS certificate of the access point 200 by using the public key of the root certificate authority. If the terminal apparatus 100 successfully verifies the TLS certificate, the terminal apparatus 100 trusts the access point 200. In contrast, in the EAP-TTLS authentication, the access point 200 determines whether the terminal apparatus 100 is valid without using the TLS certificate.

The access point 200 sends a key update command to the terminal apparatus 100 (S12). If the terminal apparatus 100 successfully verifies the TLS certificate of the access point 200 in the EAP-TTLS authentication, the terminal apparatus 100 receives this key update command. The key update command includes a renewal deadline set in the access point 200 by the administrator.

Next, the access point 200 sends a challenge message 61 to the terminal apparatus 100 (S13). The challenge message 61 includes a challenge and an old key ID. The challenge is information such as a random character string that changes per authentication. An individual challenge message includes a key ID. This key ID is an identifier that identifies a key pair of a public key and a private key. The key ID included in the challenge message specifies a private key used for generation of a digital signature. A key ID corresponding to the public key of the terminal apparatus 100 is also registered in the access point 200. In this example, since the access point 200 holds the old public key of the terminal apparatus 100, the key ID registered in the access point 200 is the old key ID. Thus, the key ID specified by the challenge message 61 is the old key ID.

The terminal apparatus 100 generates a key pair of a new public key and a new private key, generates a response message 62 from the challenge message 61, and sends the response message 62 to the access point 200 (S14). The response message 62 corresponds to a parent-child certificate that guarantees the validity of the new public key. The response message 62 includes information corresponding to the challenge, a new key ID, the new public key, a birth attribute, a generation date, and a digital signature.

The information corresponding to the challenge is the challenge itself or a code obtained by synthesizing the challenge and a predetermined another character string. The new key ID is an identifier that identifies a key pair of the new public key and the new private key generated. The terminal apparatus 100 may determine the new key ID by itself, as long as the new key ID is unique in the terminal apparatus 100. The birth attribute is information indicating that the terminal apparatus 100 has determined that the old key pair and the new key pair are present in the same apparatus. The birth attribute will be described in detail below. The generation date is the date of the generation of the new public key by the terminal apparatus 100. The generation date is collected by the administrator to manage the regular key update timing. The digital signature included in the response message 62 is obtained by encrypting data including the challenge, the new key ID, the new public key, the birth attribute, and the generation date or a hash value of the data with the old private key. The old private key used herein is specified by the old key ID included in the challenge message 61.

The access point 200 verifies the digital signature included in the response message 62. Namely, the access point 200 decrypts the digital signature by using the old public key and matches the decryption result against the above data included in the response message 62 or a hash value of the data. If both of the data matches, the access point 200 determines that the digital signature has successfully been verified. If not, the access point 200 determines that the verification of the digital signature has failed. If the digital signature has been successfully verified, the access point 200 updates the old public key of the terminal apparatus 100 held by the access point 200 to the new public key included in the response message 62. In addition, the access point 200 updates the old key ID registered in the access point 200 to the new key ID included in the response message 62.

If the access point 200 determines that the digital signature has successfully been verified, since the data range that the digital signature guarantees includes the challenge, the successful verification means successful authentication of the terminal apparatus 100. Thus, the access point 200 permits the connection of the terminal apparatus 100. The terminal apparatus 100 and the access point 200 perform a connection procedure to establish a connection (S15).

Next, the terminal apparatus 100 sends a connection request to the access point 200-1 (S16). The terminal apparatus 100 performs EAP-TTLS authentication with the access point 200-1 as it did with the access point 200 (S17).

The access point 200-1 sends a challenge message 63 to the terminal apparatus 100 (S18). The challenge message 63 includes a challenge and the new key ID. The public key of the terminal apparatus 100 held by the access point 200-1 has already been updated to the new public key. In addition, the key ID of the terminal apparatus 100 registered in the access point 200-1 has already been updated to the new key ID. Thus, the key ID specified by the challenge message 63 is the new key ID.

The terminal apparatus 100 generates a response message 64 from the challenge message 63 and sends the response message 64 to the access point 200-1 (S19). The response message 64 includes information corresponding to the challenge and a digital signature. The digital signature included in the response message 64 is obtained by encrypting data including the challenge or a hash value of the data with the new private key. The new private key used herein is specified by the new key ID included in the challenge message 63. A new key ID, a new public key, a birth attribute, and a generation date may be omitted from the response message 64.

The access point 200-1 verifies the digital signature included in the response message 64. The access point 200-1 performs this verification in the same way as it does in a period other than a key renewal period. Namely, the access point 200-1 decrypts the digital signature by using the new public key and matches the decryption result against the above data included in the response message 64 or a hash value of the data. If both of the data matches, the access point 200-1 determines that the digital signature has successfully been verified. If not, the access point 200-1 determines that the verification of the digital signature has failed. If the digital signature has successfully been verified, the access point 200-1 permits the connection of the terminal apparatus 100. The terminal apparatus 100 and the access point 200-1 perform a connection procedure to establish a connection (S20).

Next, a birth attribute included in a parent-child certificate will be described.

Figure 8:
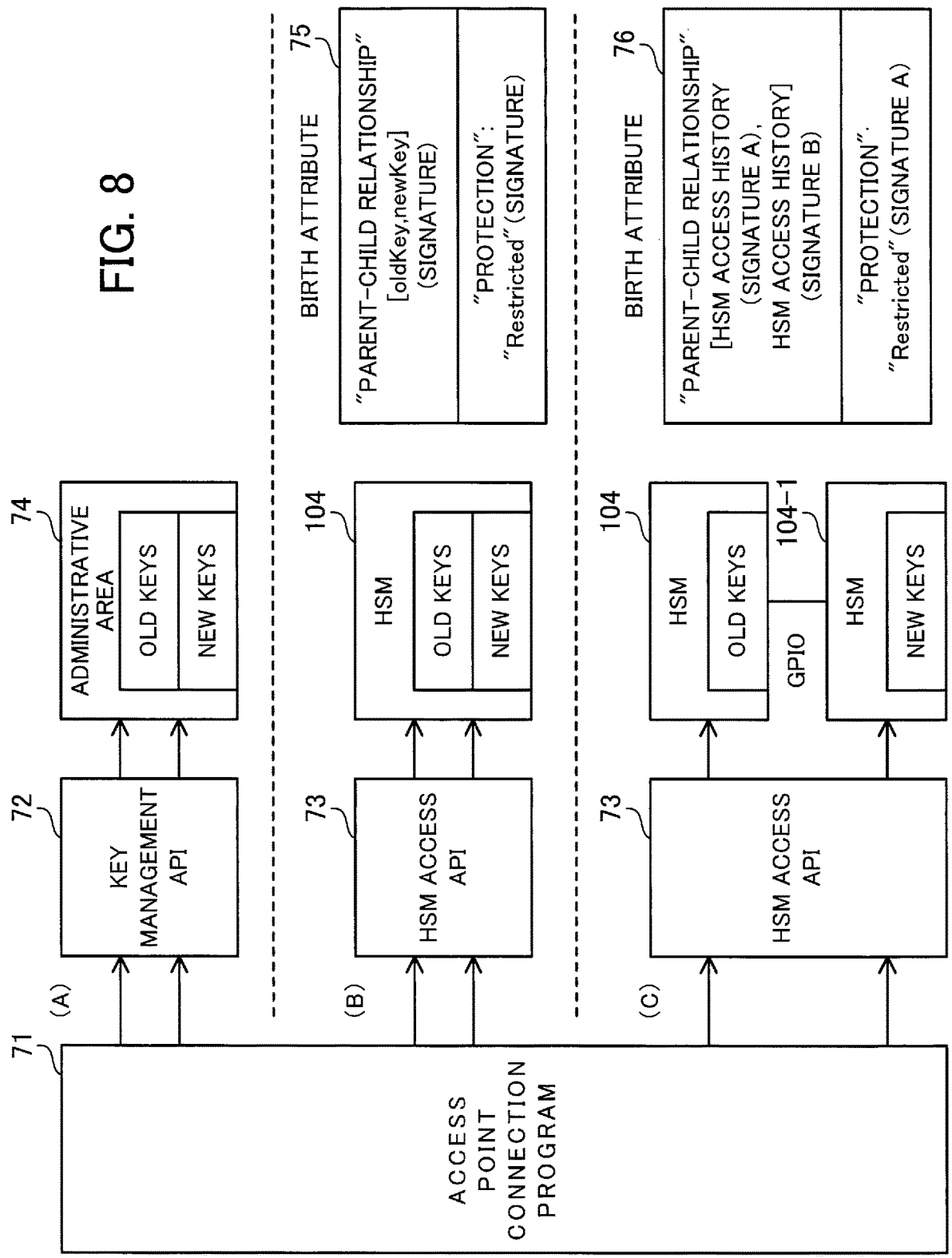
FIG. 8 illustrates birth attribute generation examples.

FIG. 8 illustrates a generation example of a birth attribute.

The terminal apparatus 100 determines that the old and new keys are appropriately managed by the terminal apparatus 100 and generates a birth attribute indicating this management. The birth attribute includes parent-child relationship information indicating that all of the old and new keys are associated with the terminal apparatus 100 and protection proof information indicating that the new keys (in particular, the new private key) is protected from being leaked to the outside of the terminal apparatus 100.

The terminal apparatus 100 performs the above key update procedure with an access point by executing an access point connection program 71. Various methods may be used to securely manage the keys. For example, in method (A), the terminal apparatus 100 securely manages the keys by using software while using access control based on the administrative authority of the OS. In method (B), the terminal apparatus 100 securely manages the keys by using a single HSM. In method (C), the terminal apparatus 100 securely manages the keys by using two HSMs. The birth attribute generated by the terminal apparatus 100 differs depending on the method used by the terminal apparatus 100 to manage the keys.

In the case of the software-based key management, the keys (in particular, the private keys) are stored in an administrative area 74, which is a storage area accessible only by the administrative authority. The access point connection program 71 calls a key management API 72, which is an application programming interface (API) of the OS, and accesses the keys in the administrative area 74 via the key management API 72.

When checking the parent-child relationship, the access point connection program 71 determines whether all of the old keys (in particular, the old private key) and the new keys (in particular, the new private key) are accessible via the key management API 72. Regarding the protection proof, the access point connection program 71 verifies a digital signature added to a library program such as a dynamic link library (DLL) called by the key management API 72. By successfully verifying the digital signature, the access point connection program 71 determines that the new keys are protected by a valid library program that has not been falsified.

When the keys are managed by a single HSM, the keys (in particular, the private keys) are stored in the HSM 104 of the terminal apparatus 100. The access point connection program 71 calls an HSM access API 73 and accesses the HSM 104 via the HSM access API 73.

When checking the parent-child relationship, the access point connection program 71 determines whether all of the old keys (in particular, the old private key) and the new keys (in particular, the new private key) are available in the HSM 104 via the HSM access API 73. Regarding the protection proof, the access point connection program 71 checks the protection level of the new keys in the HSM 104. Through the above checking, for example, the access point connection program 71 generates a birth attribute 75 illustrated in FIG. 8. The birth attribute 75 includes, as the parent-child relationship information, information obtained by adding a digital signature of the HSM 104 to a set of information about the old keys and information about the new keys. In addition, the birth attribute 75 includes, as the protection proof information, information obtained by adding the digital signature of the HSM 104 to a character string indicating the protection level of the HSM 104.

When the keys are managed by two HSMs, the old keys (in particular, the old private key) are stored in the HSM 104 of the terminal apparatus 100, and the new keys (in particular, the new private key) are stored in a different HSM of the terminal apparatus 100. By providing the terminal apparatus 100 with two HSMs whose vendors are different, even if vulnerability is found in one of the HSMs, the other HSM is used continuously. The access point connection program 71 calls an HSM access API 73 and accesses the HSMs 104 and 104-1 via the HSM access API 73. Data is exchangeable between the HSM 104 and the HSM 104-1 via a general-purpose input/output (GPIO) interface.

When checking the parent-child relationship, the access point connection program 71 determines whether the old keys are available in the HSM 104 and the new keys are available in the HSM 104-1 via the HSM access API 73. In addition, the access point connection program 71 determines whether the HSM 104 and the HSM 104-1 exist on the same substrate. For example, when one of the HSM 104 and the HSM 104-1 is a removable and external HSM, the HSM 104 and the HSM 104-1 do not exist on the same substrate. For example, the access point connection program 71 determines whether what is written via a GPIO interface on the substrate is correctly readable. Regarding the protection proof, the access point connection program 71 checks the protection level of the new keys in the HSM 104-1.

Through the above checking, for example, the access point connection program 71 generates a birth attribute 76 illustrated in FIG. 8. The birth attribute 76 includes, as the parent-child relationship information, information obtained by adding a digital signature of the HSM 104 to the access history of the HSM 104, adding the access history of the HSM 104-1 to the resultant data, and adding the digital signature of the HSM 104-1 to the resultant data. In the birth attribute 76, the digital signatures of the two HSMs are added hierarchically. In the example in FIG. 8, while the digital signature of the HSM 104 is attached first, the digital signature of the HSM 104-1 may be attached first. In addition, the birth attribute 76 includes, as the protection proof information, information obtained by adding the digital signature of the HSM 104-1 to a character string indicating the protection level of the HSM 104-1.

By inserting this birth attribute into the parent-child certificate, the level of the guarantee that the new private key and the old private key are held by the same holder and that only the valid terminal apparatus holds the new private key is improved. As a result, the reliability of the new public key included in the parent-child certificate is improved.

Next, functions of an individual terminal apparatus and an individual access point will be described.

Figure 9:
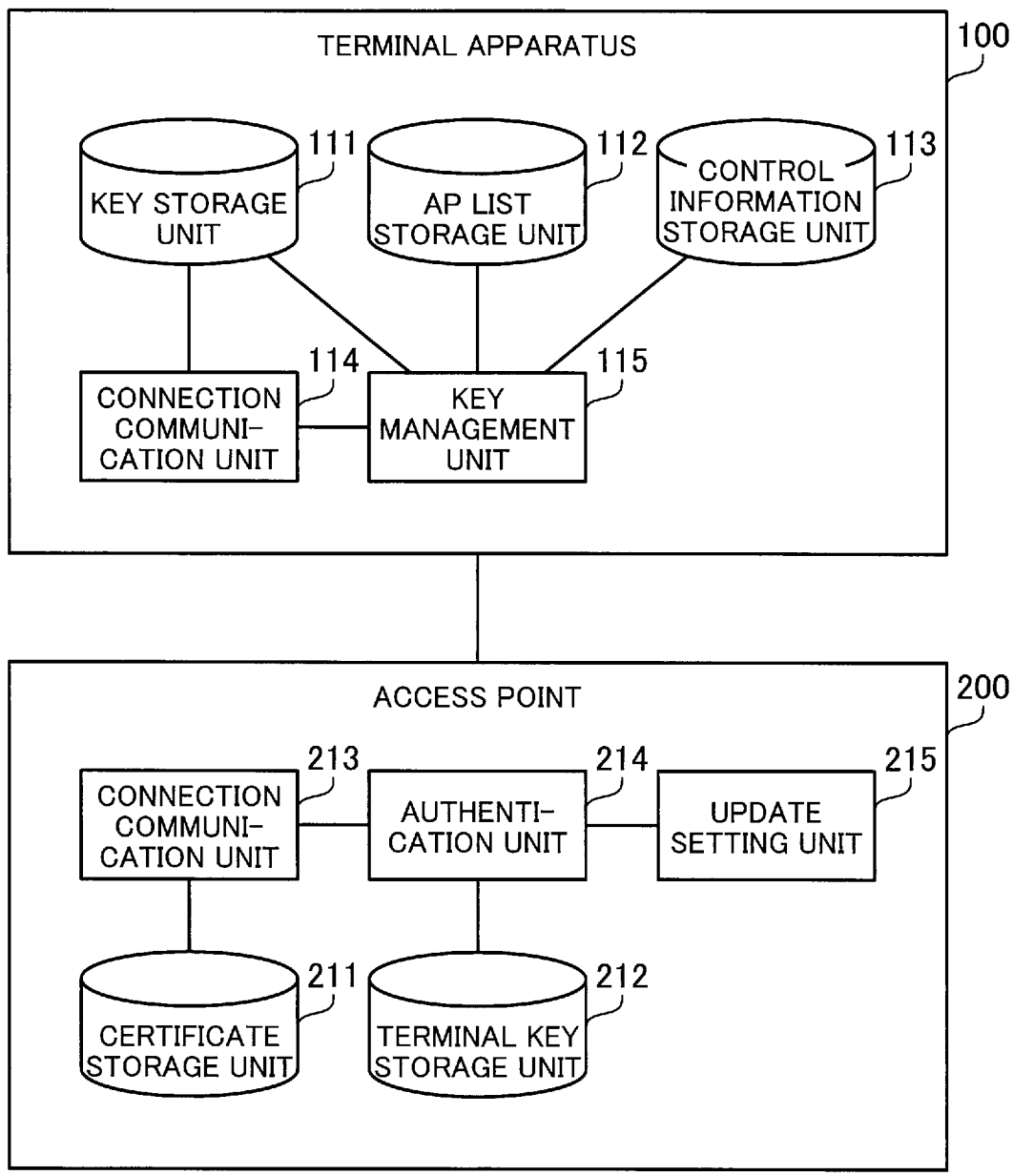
FIG. 9 is a block diagram illustrating functional examples of the terminal apparatus and the access point.

FIG. 9 is a block diagram illustrating functional examples of the terminal apparatus 100 and the access point 200.

The terminal apparatus 100 includes a key storage unit 111, an access point (AP) list storage unit 112, a control information storage unit 113, a connection communication unit 114, and a key management unit 115. The key storage unit 111 is realized by using a storage area such as the RAM 102, the SSD 103, or the HSM 104. The AP list storage unit 112 and the control information storage unit 113 are each realized by using a storage area such as the RAM 102 or the SSD 103. The connection communication unit 114 and the key management unit 115 are each realized by using a program executed by the CPU 101 or an electronic circuit of the HSM 104. The other terminal apparatuses such as the terminal apparatuses 100-1 and 100-2 also have the same functions as those of the terminal apparatus 100.

The key storage unit 111 holds a key pair of a public key and a private key. In addition, the key storage unit 111 holds information associated with the key pair such as a key ID. The key storage unit 111 holds the previous-generation old key pair in addition to the latest-generation new key pair at least during the key renewal period. When the HSM 104 is used for the key management, the main bodies of the public and private keys are stored in the HSM 104. In this case, a pointer specifying a key pair stored in the HSM 104 and information associated with the key pair are stored in a directory on a file system configured in the SSD 103. When the HSM 104 is not used for the key management, the main bodies of the public and private keys and information associated therewith are stored in a directory on a file system configured in the SSD 103. The information about the old key pair is linked with the information about the new key pair by a pointer. In addition, the key storage unit 111 holds the public key of the root certificate authority.

The AP list storage unit 112 holds an AP list in which access points connectable by the terminal apparatus 100 are listed. An individual connectable access point is identified by an identifier such as a service set identifier (SSID). The AP list is prepared by the administrator. The control information storage unit 113 holds various kinds of control information used for controlling the key update.

The connection communication unit 114 performs a procedure for connection to an access point. In the EAP-TTLS authentication, the connection communication unit 114 verifies the TLS certificate received from a connection destination access point, by using the public key of the root certificate authority stored in the key storage unit 111.

When connecting to an access point, the key management unit 115 generates a response based on challenge response authentication by using the private key stored in the key storage unit 111. When the HSM 104 is used for the key management, the HSM 104 may be used to generate a digital signature. In addition, the key management unit 115 controls the key update in a key renewal period by using the AP list stored in the AP list storage unit 112 and the control information stored in the control information storage unit 113. A key renewal period for the terminal apparatus 100 starts when the terminal apparatus 100 receives a key update command from an access point. In addition, such a key renewal period for the terminal apparatus 100 ends at the earlier one of the timing when the public keys of all the access points listed in the AP list have been updated and the timing when the renewal deadline specified by the corresponding key update command elapses.

The access point 200 includes a certificate storage unit 211, a terminal key storage unit 212, a connection communication unit 213, an authentication unit 214, and an update setting unit 215. The certificate storage unit 211 and the terminal key storage unit 212 are each realized by using a storage area in the RAM 202 or the SSD 203. The connection communication unit 213, the authentication unit 214, and the update setting unit 215 are each realized by using a program executed by the CPU 201. The other access points such as the access points 200-1 and 200-2 also have the same functions as those of the access point 200.

The certificate storage unit 211 holds a TLS certificate issued in advance to the access point 200. The TLS certificate includes a digital signature encrypted by using the private key of the root certificate authority. The TLS certificate is used for the EAP-TTLS authentication. The terminal key storage unit 212 holds a public key of an individual one of a plurality of terminal apparatuses. In addition, the terminal key storage unit 212 holds information associated with public keys such as the MAC addresses or key IDs of a plurality of terminal apparatuses.

The connection communication unit 213 performs a connection procedure with an individual terminal apparatus. In the EAP-TTLS authentication, the connection communication unit 213 sends the TLS certificate stored in the certificate storage unit 211.

When a terminal apparatus connects to the access point 200, the authentication unit 214 generates a challenge message and verifies the digital signature included in the response message by using the corresponding public key stored in the terminal key storage unit 212. This challenge message specifies a key ID stored in the terminal key storage unit 212. If the digital signature has successfully been verified, the authentication unit 214 determines the successful authentication and permits the connection to the access point 200. If the digital signature has not successfully been verified, the authentication unit 214 determines that the verification has failed and denies the connection to the access point 200.

There are cases in which the authentication unit 214 performs key update when authenticating a terminal based on challenge response authentication. After the administrator sets the start of the update in the access point 200, when the terminal apparatus whose public key has not been updated yet connects to the access point 200, the authentication unit 214 issues a key update command along with a challenge message. In addition, when a new public key is included in a response message and when the corresponding digital signature has successfully been verified, the authentication unit 214 updates the corresponding public key stored in the terminal key storage unit 212. When the public key of a certain terminal apparatus has been updated, the authentication unit 214 broadcasts the new public key to the other access points. In addition, when the authentication unit 214 receives the new public key of a terminal apparatus from a different access point, the authentication unit 214 updates the corresponding old public key stored in the terminal key storage unit 212 to the received new public key.

The update setting unit 215 receives an instruction for setting the start of the update from the administrator. The update setting unit 215 outputs a setting screen to the projector 208 and receives information entered via the keyboard 209. In the setting of the start of the update, a flag indicating that a key pair needs to be updated and a renewal deadline are entered.

Figure 10:
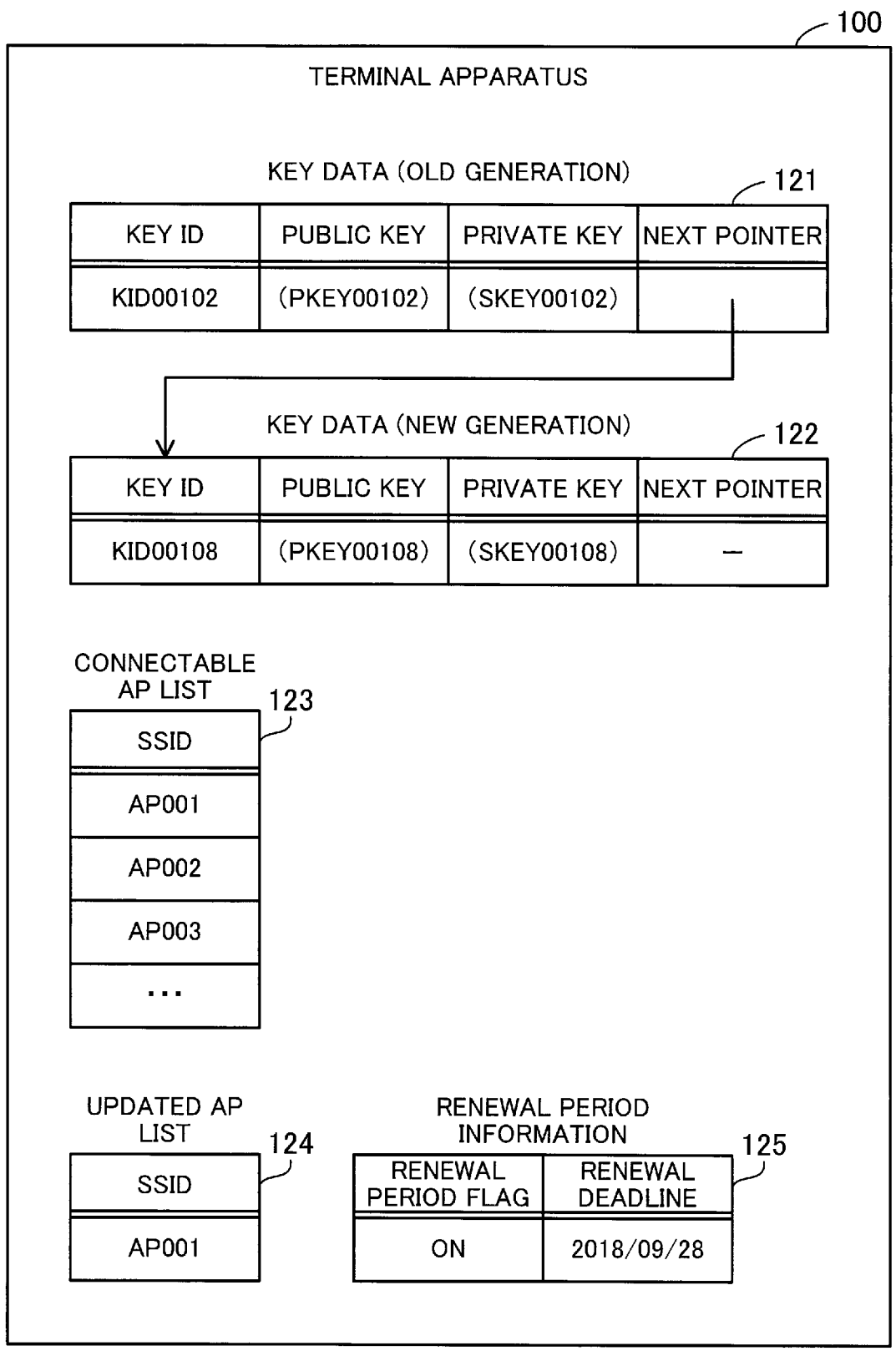
FIG. 10 illustrates data structure examples of the terminal apparatus.

FIG. 10 illustrates a data structure example of the terminal apparatus 100.

Key data 121 is stored in the key storage unit 111. The key data 121 is old-generation key data that may be removed after the corresponding key renewal period elapses. The key data 121 includes a key ID, a public key, a private key, and a next pointer. The key ID in the key data 121 is an identifier given to a corresponding key pair of an old public key and an old private key. The public key in the key data 121 is an old public key, and the private key in the key data 121 is an old private key. The HSM 104 may hold the main body of the old public key and the main body of the old private key, and the key data 121 may hold a pointer to the old public key and the old private key. The next pointer in the key data 121 is a pointer that specifies key data 122.

The key data 122 is stored in the key storage unit 111. The key data 122 is new-generation key data that is continuously held even after the corresponding key renewal period elapses. The key data 122 includes a key ID, a public key, a private key, and a next pointer. The public key in the key data 122 is a new public key, and the private key in the key data 122 is a new private key. The HSM 104 or a different HSM may include the main body of the new public key and the main body of the new private key, and the key data 122 may hold a pointer to the new public key and the new private key. The next pointer in the key data 122 is a null.

A connectable AP list 123 is stored in the AP list storage unit 112. The connectable AP list 123 lists the SSIDs of connectable access points.

An updated AP list 124 is stored in the control information storage unit 113. When the terminal apparatus 100 determines that the public key of an access point has been updated, the terminal apparatus 100 stores the SSID of the access point in the updated AP list 124. When the terminal apparatus 100 receives a challenge message including a new key ID from an access point, the terminal apparatus 100 determines that the public key of this access point has been updated.

Renewal period information 125 is stored in the control information storage unit 113. The renewal period information 125 includes a renewal period flag and a renewal deadline. The renewal period flag is a flag that indicates whether the terminal apparatus 100 is in a key renewal period. When the renewal period flag is ON, the terminal apparatus 100 is in a key renewal period. In contrast, when the renewal period flag is OFF, the terminal apparatus 100 is not in a key renewal period. The renewal deadline is a period specified by a key update command. When the terminal apparatus 100 receives a key update command, the renewal period flag is switched from OFF to ON. When the connectable AP list 123 and the updated AP list 124 match, the renewal period flag is switched from ON to OFF. The renewal period flag is also switched from ON to OFF when the corresponding renewal deadline elapses.

FIG. 11 illustrates a data structure example of an access point.

A terminal key table 221 is stored in the terminal key storage unit 212. The terminal key table 221 includes columns "MAC address", "key ID", "public key", "generation date", and "updated flag".

The MAC address in an entry is a communication address that identifies the corresponding terminal apparatus. As the identifier of the terminal apparatus, information other than the MAC address may be used. The key ID identifies a key pair of the corresponding terminal apparatus. The public key is used to verify the digital signature generated by this terminal apparatus. The generation date is the date of the generation of the key pair by this terminal apparatus. The administrator refers to these dates to manage the regular key update timing. The updated flag is a flag indicating whether the key ID, the public key, and the generation date of the corresponding terminal apparatus have been updated. When the updated flag is ON, the key ID, the public key, and the generation date have already been updated. When the updated flag is OFF, the key ID, the public key, and the generation date have not been updated yet. The initial value of the updated flag is OFF.

When the access point 200 receives a parent-child certificate from a terminal apparatus and successfully verifies the parent-child certificate by using the corresponding old public key registered in the terminal key table 221, the access point 200 updates the terminal key table 221 with the key ID, the new public key, and the generation date included in the parent-child certificate. In addition, the access point 200 updates the corresponding updated flag in the terminal key table 221 from OFF to ON. In addition, when the access point 200 has updated the terminal key table 221 based on the parent-child certificate, the access point 200 broadcasts the MAC address, the key ID, the public key, and the generation date of this terminal apparatus to the other access points. When the access point 200 receives a MAC address, a key ID, a public key, and a generation date from a different access point, the access point 200 updates the terminal key table 221 with the received key ID, public key, and generation date and updates the corresponding updated flag in the terminal key table 221 from OFF to ON.

Next, processing procedures of an individual terminal apparatus and an individual access point will be described. Hereinafter, as a representative example, a processing procedure of the terminal apparatus 100 and a processing procedure of the access point 200 will be described. The other terminal apparatuses and access points may perform like processing procedure.

Figure 12:
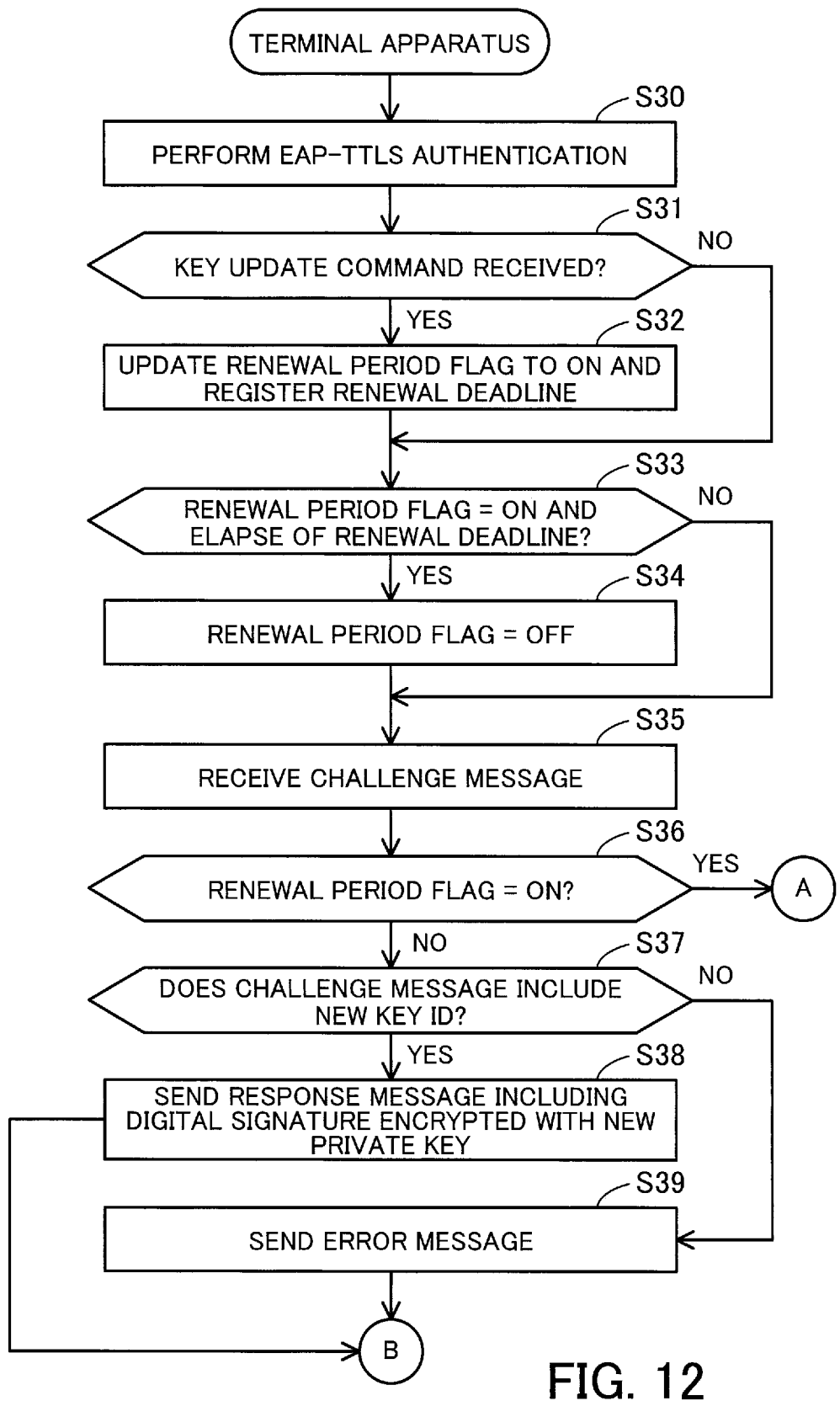
FIG. 12 is the first half of a flowchart illustrating a procedure example of the terminal apparatus.

FIG. 12 is a flowchart illustrating a procedure example of the terminal apparatus 100.

(S30) The connection communication unit 114 selects an access point specified by the user of the terminal apparatus 100 or a nearby access point detected by scanning. The connection communication unit 114 sends a connection request to the selected access point (peer apparatus) and performs a procedure of the EAP-TTLS authentication with the peer apparatus. In the EAP-TTLS authentication, the connection communication unit 114 receives a TLS certificate and verifies the TLS certificate by using the public key of a root certificate authority. When the connection communication unit 114 successfully verifies the TLS certificate, the following processing is permitted. The connection communication unit 114 notifies the peer apparatus of the MAC address of the wireless interface 108.

(S31) The key management unit 115 determines whether the key management unit 115 has received a key update command. If the key management unit 115 has received a key update command, the processing proceeds to step S32. If not, the processing proceeds to step S33.

(S32) The key management unit 115 updates the renewal period flag in the renewal period information 125 stored in the control information storage unit 113 from OFF to ON. In addition, the key management unit 115 registers the renewal deadline included in the key update command in the renewal period information 125.

(S33) The key management unit 115 determines whether the renewal period flag in the renewal period information 125 is ON and whether the renewal deadline registered in the renewal period information 125 has already elapsed. If these conditions are satisfied, the processing proceeds to step S34. If not, the processing proceeds to step S35.

(S34) The key management unit 115 updates the renewal period flag from ON to OFF. After the renewal period flag is updated to OFF, the key data 121 may be removed.

(S35) The connection communication unit 114 receives a challenge message.

(S36) The key management unit 115 determines whether the renewal period flag in the renewal period information 125 is ON. If the renewal period flag is ON, the processing proceeds to step S40. If not, the processing proceeds to step S37.

(S37) The key management unit 115 extracts a key ID from the challenge message. The key management unit 115 refers to the key data 121 and 122 stored in the key storage unit 111 and determines whether the extracted key ID is a key ID registered in the key data 122, namely, a new key ID that indicates a new-generation key pair. If the key ID included in the challenge message is a new key ID, the processing proceeds to step S38. If not, the processing proceeds to step S39. There is a chance that the key data 121 that indicates the old-generation key pair has already been removed from the key storage unit 111.

(S38) The key management unit 115 acquires a new private key from the key data 122. The key management unit 115 extracts a challenge from the challenge message and generates signature target data from the challenge. The signature target data includes the challenge itself or a code obtained by synthesizing the challenge and a predetermined character string. The key management unit 115 generates a digital signature by encrypting the above data or a hash value thereof by using the new private key. The key management unit 115 generates a response message including the above data and digital signature. The connection communication unit 114 sends the response message. Next, if the peer apparatus permits the corresponding connection, the connection communication unit 114 performs a connection procedure with the peer apparatus. Next, the processing of the terminal apparatus 100 is ended.

(S39) The key management unit 115 denies the challenge response authentication using the key ID specified by the challenge message. The connection communication unit 114 sends an error message. Next, the processing of the terminal apparatus 100 is ended.

Figure 13:
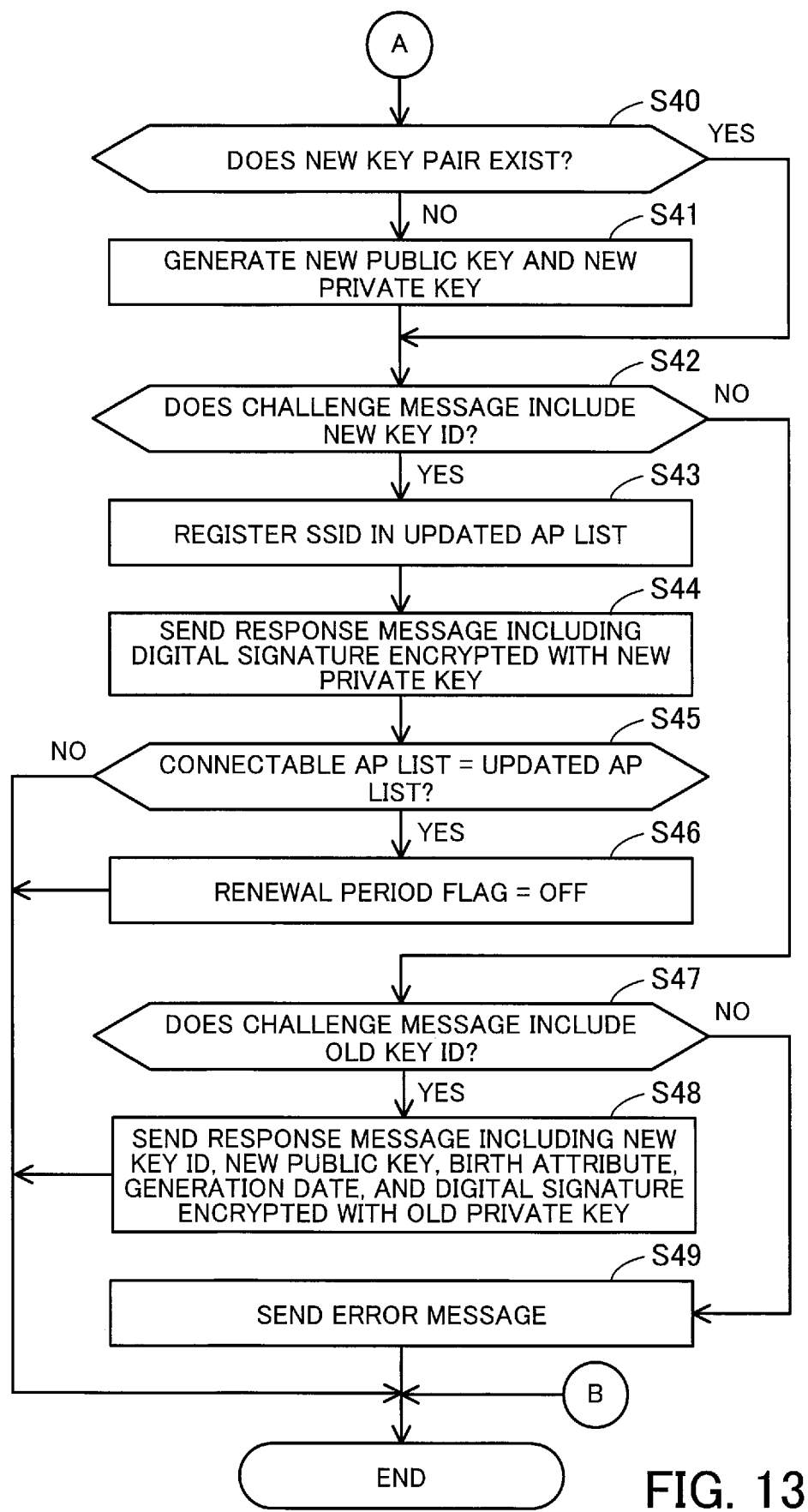
FIG. 13 is the second half of the flowchart illustrating the procedure example of the terminal apparatus.

FIG. 13 is the second half of the flowchart illustrating the procedure example of the terminal apparatus 100.

(S40) The key management unit 115 determines whether the new-generation key pair exists, namely, whether the key data 122 indicating the new-generation key pair is stored in the key storage unit 111. The key data 122 is reached by tracking a pointer from the key data 121 indicating the corresponding old-generation key pair. If the new-generation key pair exists, the processing proceeds to step S42. If not, the processing proceeds to step S41.

(S41) The key management unit 115 generates a key pair of a new public key and a new private key. In addition, the key management unit 115 adds a new key ID to the generated key pair. The key management unit 115 generates the new key ID and the key data 122 indicating the new public key and the new private key and stores the new key ID and the key data 122 in the key storage unit 111. The key management unit 115 registers a pointer to the key data 122 in the key data 121.

(S42) The key management unit 115 extracts a key ID from the challenge message and determines whether the extracted key ID is the key ID registered in the key data 122, namely, the new key ID indicating the new-generation key pair. If the key ID included in the challenge message is the new key ID, the processing proceeds to step S43. If not, the processing proceeds to step S47.

(S43) The key management unit 115 registers the SSID of the peer apparatus in the updated AP list 124 stored in the control information storage unit 113.

(S44) The key management unit 115 acquires the corresponding new private key from the key data 122. The key management unit 115 extracts a challenge from the challenge message and generates signature target data from the challenge. The key management unit 115 generates a digital signature by encrypting the above data or a hash value thereof with the new private key. The key management unit 115 generates a response message including the above data and digital signature. The connection communication unit 114 sends a response message and performs, if the peer apparatus permits the corresponding connection, a connection procedure with the peer apparatus.

(S45) The key management unit 115 compares the connectable AP list 123 stored in the AP list storage unit 112 with the updated AP list 124 stored in the control information storage unit 113. The key management unit 115 determines whether the connectable AP list 123 and the updated AP list 124 match. If these lists match, the processing proceeds to step S46. If not, namely, if the latter list is smaller than the former list, the processing of the terminal apparatus 100 is ended.

(S46) The key management unit 115 updates the renewal period flag in the renewal period information 125 from ON to OFF. After the renewal period flag is updated to OFF, the key data 121 may be removed. Next, the processing of the terminal apparatus 100 is ended.

(S47) The key management unit 115 determines whether the key ID extracted from the challenge message is the key ID registered in the key data 121, namely, the old key ID indicating the previous-generation key pair. If the key ID included in the challenge message is the old key ID, the processing proceeds to step S48. If not, the processing proceeds to step S49. Namely, if the key ID included in the challenge message is neither the key ID of the latest key pair nor the key ID of the previous key pair, the challenge message specifies a null key ID irrelevant to any of the key pairs held.

(S48) The key management unit 115 acquires the old private key from the key data 121. The key management unit 115 extracts a challenge from the challenge message, generates a birth attribute about the reliability of the new public key, and generates signature target data. The birth attribute includes parent-child relationship information indicating that both of the old private key and the new private key exist in the terminal apparatus 100 and protection proof information indicating the protection level of the new private key. For example, the key management unit 115 generates the birth attribute by using the signature function of the HSM 104. The signature target data includes the challenge itself or a code obtained by synthesizing the challenge and a predetermined character string. In addition, the signature target data includes the new key ID added in step S41, the new public key generated in step S41, the generated birth attribute, and the generation date.

The key management unit 115 generates the digital signature by encrypting the above data or a hash value thereof with the old private key. The key management unit 115 generates a response message including the above data and digital signature. This response message corresponds to a parent-child certificate. The connection communication unit 114 sends the response message. If the peer apparatus permits the corresponding connection, the connection communication unit 114 performs a connection procedure with the peer apparatus. Next, the processing of the terminal apparatus 100 is ended.

(S49) The key management unit 115 denies the challenge response authentication using the key ID specified by the challenge message. The connection communication unit 114 sends an error message.

Figure 14:
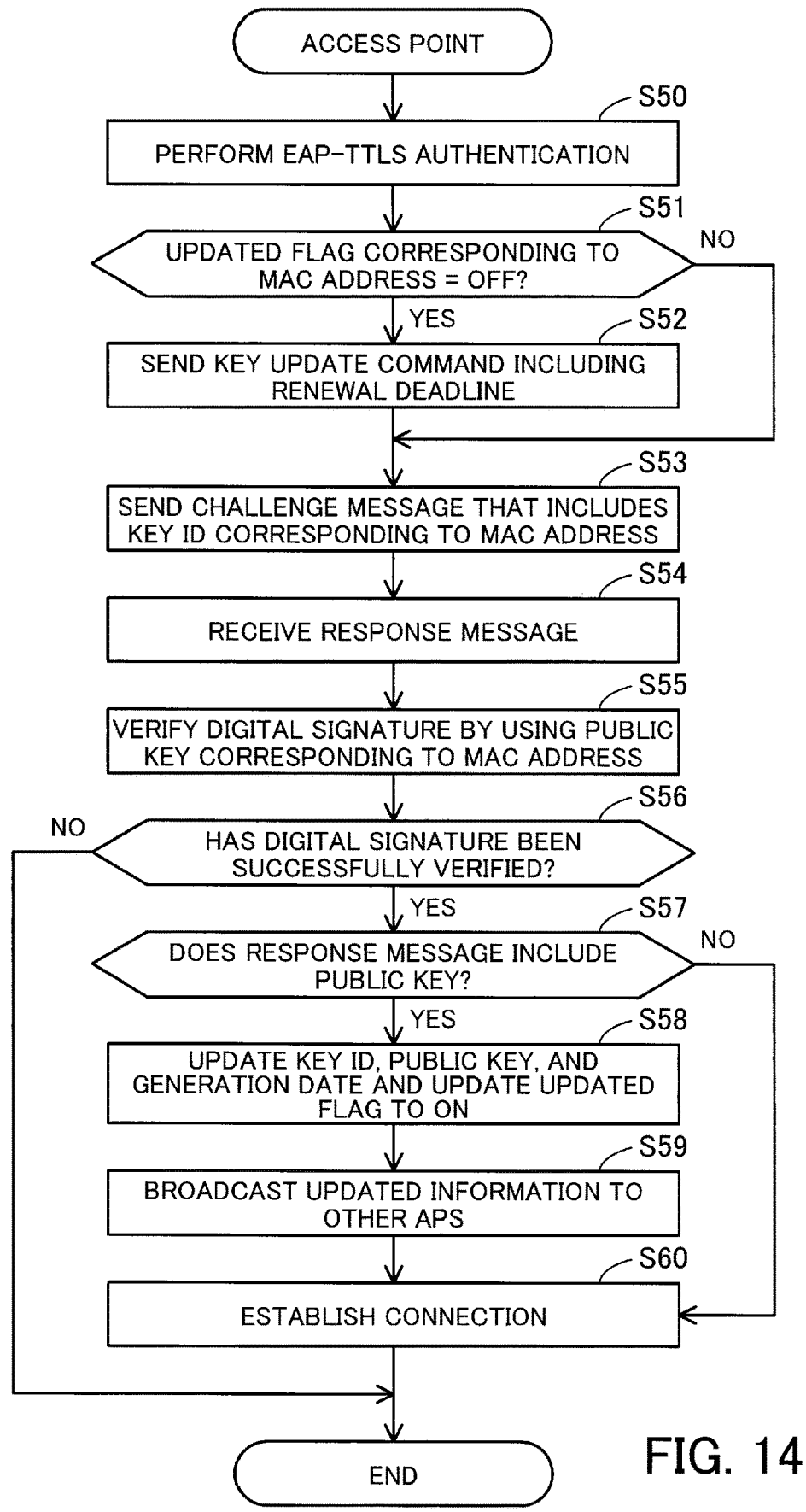
FIG. 14 is a flowchart illustrating a procedure example of the access point.

FIG. 14 is a flowchart illustrating a procedure example of the access point 200.

(S50) The connection communication unit 213 receives a connection request from a terminal apparatus (peer apparatus) and performs a procedure for the EAP-TTLS authentication with the peer apparatus. In the EAP-TTLS authentication, the connection communication unit 213 sends a TLS certificate stored in the certificate storage unit 211 to the peer apparatus. In addition, the connection communication unit 213 is notified of a MAC address by the peer apparatus.

(S51) The authentication unit 214 searches the terminal key table 221 stored in the terminal key storage unit 212 for an updated flag corresponding to the MAC address of the peer apparatus. The authentication unit 214 determines whether the updated flag is OFF. If the updated flag is OFF, the processing proceeds to step S52. If the updated flag is ON, the processing proceeds to step S53.

(S52) The authentication unit 214 sends a key update command including a renewal deadline. The administrator enters the renewal deadline to the update setting unit 215 when setting the start of the update.

(S53) The authentication unit 214 extracts a key ID corresponding to the MAC address of the peer apparatus from the terminal key table 221. In addition, the authentication unit 214 generates a challenge such as a random character string that changes per authentication. The authentication unit 214 generates a challenge message that includes the challenge and the key ID. The connection communication unit 213 sends the challenge message.

(S54) The connection communication unit 213 receives a response message.

(S55) The authentication unit 214 extracts a public key corresponding to the MAC address of the peer apparatus from the terminal key table 221. In addition, the authentication unit 214 extracts a digital signature and signature target data from the response message. The authentication unit 214 decrypts the digital signature by using the public key and compares the decryption result with the signature target data or a hash value thereof. If both of the data matches, the authentication unit 214 determines that the digital signature has been successfully verified. If not, the authentication unit 214 determines that the verification of the digital signature has failed.

(S56) The authentication unit 214 determines whether the digital signature has been successfully verified in step S55. If the digital signature has been successfully verified, the processing proceeds to step S57. If not, the connection communication unit 213 denies the connection from the peer apparatus and ends the present processing of the access point 200.

(S57) The authentication unit 214 determines whether a public key is included in the signature target data in the response message. If a public key is included, the processing proceeds to step S58. If not, the processing proceeds to step S60.

(S58) The authentication unit 214 extracts the key ID, the public key, and the generation date from the signature target data in the response message. The authentication unit 214 updates the key ID, the public key, and the generation date corresponding to the MAC address of the peer apparatus in the terminal key table 221 to those extracted from the response message. In addition, the authentication unit 214 updates the updated flag corresponding to the MAC address of the peer apparatus in the terminal key table 221 from OFF to ON. Alternatively, the authentication unit 214 may verify the birth attribute included in the signature target data in the response message and update the public key, etc. only when the birth attribute is valid. For example, the authentication unit 214 may verify the digital signature included in the birth attribute by using the public key of the HSM vendor. Alternatively, the authentication unit 214 may hold the birth attribute so that the administrator is able to check the birth attribute.

(S59) The authentication unit 214 generates updated information including the MAC address, key ID, public key, and generation date. The authentication unit 214 broadcasts the updated information to the other access points such as the access points 200-1 and 200-2.

(S60) The authentication unit 214 permits the connection from the peer apparatus. The connection communication unit 213 performs a connection procedure with the peer apparatus.

In the information processing system according to the second embodiment, a certain one of plurality of access points sends a key update command to a plurality of terminal apparatuses. In response to the key update command, each of the plurality of terminal apparatuses generates a key pair of a new public key and a new private key. When a single access point sends a challenge message that specifies an old key ID to a single terminal apparatus at the time of authentication, the terminal apparatus sends a parent-child certificate as a response message to the access point. The parent-child certificate includes a new key ID, a new public key, a birth attribute indicating the sameness of the holder of new and old keys and the protection level of a new private key, and a digital signature based on an old private key. If the access point successfully verifies the parent-child certificate, the access point updates the public key of the terminal apparatus held by the access point. In addition, when the single access point sends a challenge message that specifies the new key ID to the single terminal apparatus at the time of authentication, the terminal apparatus sends a normal response message including a digital signature based on the new private key. The old private key is disabled when the renewal deadline specified by a key update command has elapsed or when the public keys of all the available access points have been updated.

In this way, the keys of a plurality of terminal apparatuses are updated more simply. Namely, since the administrator does not need to manually set a new private key in an individual terminal apparatus by using a physical medium such as a portable recording medium or a cable, the burden on the administrator is reduced. In addition, since the present embodiment does not need installation of a key management server for integrally managing the update of key pairs, the present embodiment is free from the burden of the operation and management of such a key management server. In addition, since there is no need to assign an administrator with high information processing skills for the operation and management of such a key management server, it is possible to operate the present information processing system even in environments such as schools where securing administrators with high information processing skills is difficult.

In addition, when the private keys held by a plurality of terminal apparatuses and the public keys held by a plurality of access points are updated, since the administrator only needs to set the start of the update in a certain one of access points, the burden on the administrator is reduced. In addition, when a parent-child certificate is used, the validity of a new public key is guaranteed by the holder of a corresponding old private key. Thus, a new public key generated by an individual terminal apparatus is securely accepted by a plurality of access points. In addition, since an individual terminal apparatus checks the security of the management of a new private key and inserts a birth attribute into a parent-child certificate, the security of the reception of the new public key by a plurality of access points is improved. In addition, an individual terminal apparatus is allowed to use both an old private key and a new private key only in a key renewal period. Namely, the old private key is disabled after the key renewal period elapses. Thus, the security of the authentication of an individual terminal apparatus is improved.

In one aspect, the keys are updated more simply.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A key generation apparatus comprising:
a memory configured to store a first private key corresponding to a first public key;
a communication interface configured to communicate with a peer apparatus that stores the first public key; and
a processor configured to generate a second public key and a second private key in response to a key update request from the peer apparatus, generate a digital signature by encrypting data including the second public key with the first private key, send a message including the data and the digital signature to the peer apparatus via the communication interface, and switch the first private key to the second private key; and
when the peer apparatus authenticates the key generation apparatus, the processor sends the message via the communication interface in response to a challenge message from the peer apparatus, the challenge message includes key specification information that specifies a private key to be used,
wherein when the key specification information specifies the first private key, the processor sends the message via the communication interface, and
when the key specification information specifies the second private key, the processor generates a different digital signature by encrypting the challenge message with the second private key and sends a different message including the different digital signature to the peer apparatus via the communication interface.

2. The key generation apparatus according to claim 1, wherein the digital signature is verified by the peer apparatus by using the first public key, and the first public key stored in the peer apparatus is switched to the second public key.

3. The key generation apparatus according to claim 1, wherein the processor generates proof information indicating that the first private key and the second private key are stored in a single apparatus and inserts the proof information into the data.

4. The key generation apparatus according to claim 1,
wherein the peer apparatus is an access point that performs wireless communication, and
wherein the communication interface is a wireless interface that wirelessly connects to the peer apparatus.

5. A key update method comprising:
generating, by a processor included in a computer, a second public key and a second private key in response to a key update request from a peer apparatus storing a first public key corresponding to a first private key stored in the computer;
generating, by the processor, a digital signature by encrypting data including the second public key with the first private key and sending a message including the data and the digital signature to the peer apparatus;
switching, by the processor, the first private key to the second private key;
when the peer apparatus authenticates the key generation apparatus, sending, by the processor, the message in response to a challenge message from the peer apparatus, the challenge message includes key specification information that specifies a private key to be used, wherein when the key specification information specifies the first private key, sending by the processor the message via the communication interface, and
when the key specification information specifies the second private key, generating by the processor a different digital signature by encrypting the challenge message with the second private key and sending a different message including the different digital signature to the peer apparatus.

6. A non-transitory computer-readable recording medium storing therein a computer program that causes a computer to execute a process comprising:
generating a second public key and a second private key in response to a key update request from a peer apparatus storing a first public key corresponding to a first private key stored in the computer;
generating a digital signature by encrypting data including the second public key with the first private key and sending a message including the data and the digital signature to the peer apparatus;
switching the first private key to the second private key;
when the peer apparatus authenticates the key generation apparatus, sending, by the processor, the message in response to a challenge message from the peer apparatus, the challenge message includes key specification information that specifies a private key to be used, wherein when the key specification information specifies the first private key, sending by the processor the message via the communication interface, and
when the key specification information specifies the second private key, generating by the processor a different digital signature by encrypting the challenge message with the second private key and sending a different message including the different digital signature to the peer apparatus.

* * * * *